(12) United States Patent
Spencer et al.

(10) Patent No.: US 6,223,949 B1
(45) Date of Patent: May 1, 2001

(54) SPINNING VALVE

(75) Inventors: Jack Spencer, Westerville; Eric Rousculp, Worthington, both of OH (US)

(73) Assignee: Norse Dairy Systems, Inc., Columbus, OH (US)

( * ) Notice: Subject to any disclaimer, the term of this patent is extended or adjusted under 35 U.S.C. 154(b) by 0 days.

(21) Appl. No.: 09/232,934

(22) Filed: Jan. 19, 1999

(51) Int. Cl.[7] .................................................. B67D 5/52
(52) U.S. Cl. ..................... 222/140; 222/129; 222/138; 222/139; 137/605; 137/637.4; 141/234; 141/236; 141/259
(58) Field of Search ...................................... 141/129, 163, 141/234–236, 250, 258, 259, 264, 285, 286, 301, 392; 137/637.4, 605; 222/129, 138–140, 251, 264, 280

(56) References Cited

U.S. PATENT DOCUMENTS

| | | | |
|---|---|---|---|
| 2,733,731 | * | 2/1956 | Turak ..................................... 137/597 |
| 2,919,724 | * | 1/1960 | Anderson .................................. 141/9 |
| 3,267,971 | * | 8/1966 | Mueller ..................................... 141/9 |
| 4,477,473 | * | 10/1984 | Schoonmaker et al. ............. 426/231 |
| 5,888,567 | * | 3/1999 | Daouse .................................. 426/249 |

* cited by examiner

Primary Examiner—Timothy L. Maust
(74) Attorney, Agent, or Firm—Standley & Gilcrest LLP

(57) ABSTRACT

The present invention includes a spinning valve having an inner valve portion and an outer valve portion, and having multiple inlets and multiple chambers at different heights along the longitudinal axis of the inner valve portion. The present invention also includes a spinning valve having an inner valve portion and an outer valve portion, with multiple inlets at the same height along the longitudinal axis of the inner valve portion with single or multiple chambers at that location along the longitudinal axis. In each of these valves, the inner valve portion is adapted to spin within the outer valve portion. Additionally, the present invention includes an apparatus for dispensing two or more discrete streams of fluid into a series of containers by using one of the aforementioned valves.

37 Claims, 30 Drawing Sheets

SECTION A-A

SECTION B-B

SECTION A-A

SECTION B-B

SECTION C-C

SECTION D-D

SECTION E-E

SECTION A-A

SECTION B-B

SECTION C-C

SECTION D-D

SECTION E-E

SECTION A-A

SECTION B-B

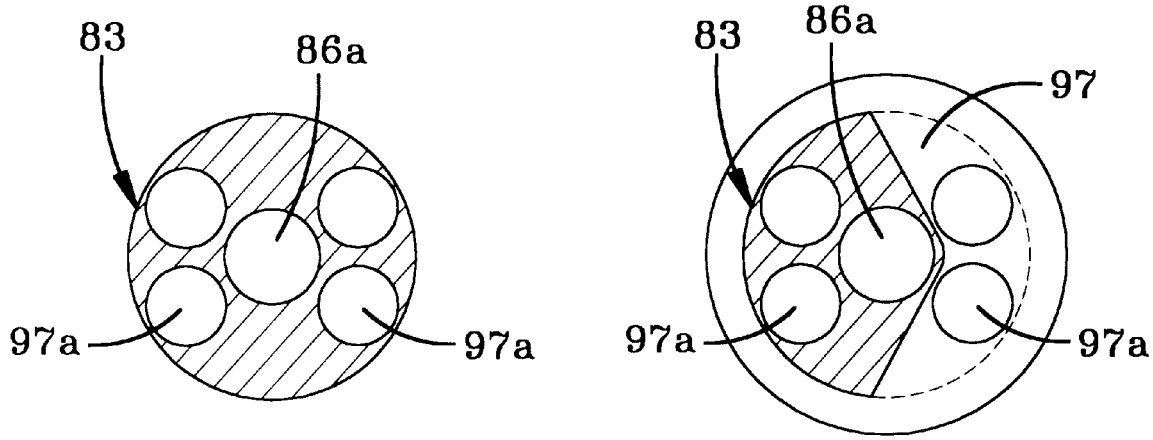
SECTION A-A
FIG-9A
SECTION B-B
FIG-9B
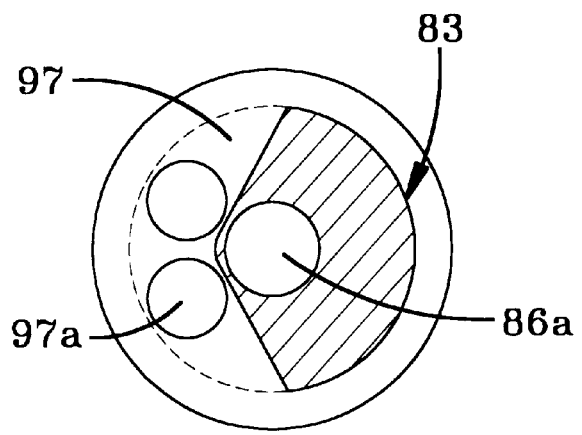
SECTION C-C
FIG-9C

SECTION E-E

SPINNING VALVE

TECHNICAL FIELD

The present invention is in the field of valves, particularly those for food products, and dispensing machines using those valves.

BACKGROUND

The present invention represents an improvement over valves used for dispensing food products, such as ice cream and frozen yogurt, etc., into a container so as to form a pattern in the finished, packaged product.

In dispensing these food products, it is desirable to be able to spin the container with respect to the food product as it is dispensed into the container. Spinning the container with respect to the food product is beneficial as it helps to insure uniform filling while eliminating voids in the package product.

Spinning the container with respect to the food product also create a swirled or variegated patterns using multiple food product types, flavors or colors (such as multiple ice cream flavors or syrups). Varied patterns are typically produced by introducing a syrup in the supply line before the filler valve. The mixing process is sometimes enhanced by an in-line powered variegater.

Such patterns are desirable to give the product an attractive appearance especially both through transparent or translucent containers, as well as to present an interesting or attractive pattern to the consumer as the food product is consumed. This is particularly true in the case of frozen food products such as ice cream and frozen yogurt products.

Spinning the container with respect to the food product helps to insure uniform filling while eliminating voids in the package product.

Large and small containers are spun by the filling machine during the time the container is under the filling valve. Large, slowly filling containers are not difficult to spin, but as the size of the container is reduced, or in the case of oddly-shaped containers (such as so-called "push-up" tubes and cones), problems arise. The container must be accelerated from a motionless state after they are indexed into the filling position under the filling valve, arid due to the short duration of the filling, it is nearly impossible to achieve a consistent pattern. Additionally, the area around the filling position is normally subjected to product spillage, and a small amount of spilled product (such as ice cream) can cause the container to slip in the spinning mechanism, instead of spinning. Cones are also very difficult to spin, and indeed, it is not known whether cones have ever successfully been spun for dispensing purposes.

Accordingly, it is desirable to be able to dispense a spun product typically in instances where spinning the container is not feasible.

The valve shown schematically in FIG. 1 was designed for the purpose of distributing a single food product such as a single flavor of ice cream into a number of outlet ports leading to filling valves or nozzles. It operated by having a motor turn a perforated disk which alternately opened and closed ports which led out of a circular chamber.

The valve shown schematically in FIG. 2 was developed to produce a unique variegated pattern in a cone product. The purpose of this valve type was to fill a cone with ice cream and syrup so as to produce the rippled appearance. It did not require the cone to be spinning while being filled. This valve used a method wherein the ice cream passed through a spinning nozzle having a star-shaped opening. The syrup was sprayed onto the surface of the ice cream as it passed through a range. When the star-shape flattened says the container is filled, a ripple pattern is produced.

SUMMARY OF THE INVENTION

The present invention includes a spinning valve having an inner valve portion and an outer valve portion, and having multiple inlets and multiple chambers at different heights along the longitudinal axis of the inner valve portion. The present invention also includes a spinning valve having an inner valve portion and a outer valve portion, with multiple inlets at the same height along the longitudinal axis of the inner valve portion with single or multiple chambers at that location along the longitudinal axis.

Also part of the present invention is an apparatus for dispensing two or more discrete streams of fluid into a series of containers by using a valve of the present invention.

Another variation of the spinning valve of the present invention is capable of solving the problem of spinning small diameter "push-up" tubes in order to produce a "Barber Pole" pattern. The spinning valve of the present invention will also operate for filling cones to produce a fill pattern never before attainable. It has been found that the valve of the present invention—with an optional modification—could be used as a layering valve, capable of depositing a food product such as ice cream in multiple repeat layers. This is a process which heretofore would have required a different filling valve for, and an index between, each layer. Due to the impracticality of such approach, this type of layered ice cream product has not been commercially made. Naturally, it is always more complicated to spin a valve rather than a container, due to the need to use rotary seals.

The valve of the present invention may be produced from any suitable material, such as metals, plastics and ceramics. Typically, for food product dispensing, the valve portion will be machined from any appropriate grade of stainless-steel.
Multiple Inlets/Multiple Chambers at Different Heights Along Longitudinal Axis of Inner Valve Portion In broad terms, one of the valves of the present invention is a valve for dispensing at least two discrete streams of fluid, the valve comprising: an inner valve portion and an outer valve portion, the inner valve portion having a nozzle end and adapted to spin within the outer valve portion, the outer valve portion having at least two inlets, the inner valve portion having a respective chamber in discrete fluid conductive alignment with each inlet, each chamber having a fluid conduit adapted to discretely conduct a fluid to the nozzle end of the inner valve portion.

It is preferred that the outer valve portion have at least three inlets. Each chamber may be an annular chamber fully extending around the circumference of the inner valve body, or an arcuate chamber extending around a portion of the circumference of the inner valve body, depending upon the desired design to be formed by the product where two or more different products are dispensed.

Where more than one of the chambers are arcuate, they may each define an arc of a number of degrees, the number of degrees being approximately equal to 360/n wherein n is the number of the chambers. To make a discretely layered product, each arcuate chamber may define an arc of a number of degrees, the number of degrees being approximately equal to 360/n wherein n is the number of the chambers, and wherein the arcuate chambers are staggered about the longitudinal axis and with respect to their respective inlet port such that at any given point in the travel of the inner valve portion, that n−1 discrete streams of fluid are supplied to the nozzle. As an alternative, each arcuate chamber may define an arc of a number of degrees, the number of degrees being approximately equal to 360/n wherein n is the number of the chambers, and wherein the arcuate chambers are staggered about the longitudinal axis and with respect to their respective inlet port such that at any given point in the travel of the inner valve portion, that n−2 discrete streams of fluid are supplied to the nozzle. This will give a slightly different pattern of layers.

The outer valve portion may comprise two, three or more pieces. Preferably, the outer valve portion comprises at least two pieces defining an interface between them, the pieces having a compressible gasket in the interface, and the two pieces comprising an interface abutment portion so as to restrict the compression of the gasket in the interface.

It is preferred that the valve additionally comprises a gear in removable engagement with the inner valve portion.

In a preferred embodiment, the inner valve portion has a cylindrical portion, the cylindrical portion having at least two annular chambers substantially perpendicular to the longitudinal axis, each respective chamber connected to a longitudinal fluid conduit adapted to conduct a fluid to the nozzle and the outer valve body adapted to enclose the inner valve portion, allowing the cylindrical portion to spin within it.

As a variation of the first type of valve, the chambers within the inner valve body portion may be designed such that they are capable of accepting a continuous feed of the food product from its source. This variation allows for the production of a food product to be dispensed so as to present a spiral design formed from continuous streams of at least two products.

Dispensing Apparatus Using Valve of the First Type

The present invention also includes an apparatus for dispensing at least two discrete streams of fluid into a series of containers, the apparatus comprising: (a) a container transport apparatus adapted to transport the containers in a series to and beyond a filling position; (b) a filling apparatus positioned so as to fill one of the containers, when one of the containers is in the filling position, the filling apparatus comprising: (1) a valve for dispensing at least two discrete streams of liquid, the valve comprising: an inner valve portion and a outer valve portion, the inner valve portion having a nozzle end and adapted to spin within the outer valve portion, the outer valve portion having at least two inlets, the inner valve portion having a respective chamber in discrete fluid conductive alignment with each inlet, each chamber in fluid conductive alignment with a fluid conduit adapted to discretely conduct a fluid to the nozzle end of the inner valve portion; and (2) a motor connected to the inner valve portion and adapted to spin the inner valve portion within the outer valve body.

The valves used in this dispensing apparatus of the present invention may be any of those described above.

Multiple Inlets at Same Height/Single or Multiple Chambers in Inner Valve Portion In broad terms, another of the valves of the present invention is a valve for dispensing at least two discrete streams of fluid, the valve comprising: an inner valve portion and an outer valve portion, the inner valve portion having a nozzle end and adapted to spin within the outer valve portion, the outer valve portion having a longitudinal axis; the outer valve portion having inlets, the inlets being directed at substantially the same location along the longitudinal axis of the outer valve portion; the inner valve portion having x chambers being at substantially the same location along the longitudinal axis of the outer valve portion as the inlets, and the chambers of sufficient size so as to be in fluid conductive alignment with less than all of the inlets at any point along the rotation of the inner valve portion within the outer valve portion, wherein n is an integer greater than one and n−x is a positive integer of one or more; and each chamber having a fluid conduit adapted to conduct a fluid to the nozzle end of the inner valve portion.

The chambers of the inner valve portion each may define an arc of a number of degrees, the number of degrees being approximately equal to 360/x. In one particular embodiment of the present invention, each chamber defines an arc of a number of degrees, the number of degrees being approximately equal to 360/x, and wherein the arcuate chambers are disposed about the longitudinal axis and with respect to the inlet ports such that at any given point in the travel of the inner valve portion, that n−1 discrete streams of fluid are supplied to the nozzle.

In one embodiment, the outer valve body comprises two inlets each directed toward the longitudinal axis at an angle of about 180 degrees and comprising one chamber defining an arc of about 180 degrees. In another embodiment, outer valve body comprises three inlets each directed toward the longitudinal axis at an angle of about 120 degrees and comprising two adjacent chambers each defining an arc of about 120 degrees. In one embodiment, each arcuate chamber defines an arc of a number of degrees, the number of degrees being approximately equal to 360/x, and wherein the chambers are disposed about the longitudinal axis and with respect to the inlet ports such that at any given point in the travel of the inner valve portion, that n−2 discrete streams of fluid are supplied to the nozzle. For instance, the outer valve portion may have three inlets each directed toward the longitudinal axis at an angle of about 120 degrees and comprising one chamber each defining an arc of about 120 degrees, or four inlets each directed toward the longitudinal axis at an angle of about 90 degrees and comprising two chambers each defining an arc of about 90 degrees.

In still another embodiment, the chambers of the inner valve portion each may define an arc of a number of degrees, the number of degrees being approximately equal to 360/x, and wherein the arcuate chambers are disposed about the longitudinal axis and with respect to the inlet ports such that at any given point in the travel of the inner valve portion, that n−3 discrete streams of fluid are supplied to the nozzle. For instance, the outer valve body may have four inlets each directed toward the longitudinal axis at an angle of about 90 degrees and comprising one arcuate chamber each defining an arc of about 90 degrees.

The outer valve portion may comprise two, three or more pieces. In a preferred embodiment, the outer valve portion comprises at least two pieces defining an interface therebetween, the pieces having a compressible gasket in the interface, the two pieces comprising an interface abutment portion so as to restrict the compression of the gasket in the interface.

It is preferred that the valve additionally comprises a gear in removable engagement with the inner valve portion.

Dispensing Apparatus Using Valve of the Second Type

The present invention also includes an apparatus for dispensing at least two discrete streams of fluid into a series of containers, the apparatus comprising: (a) a container transport apparatus adapted to transport the containers in a series to and beyond a filling position; (b) a filling apparatus positioned so as to fill one of the containers, when one of the containers is in the filling position, the filling apparatus comprising: (1) a valve for dispensing at least two discrete streams of liquid, the valve comprising: an inner valve portion and an outer valve portion, the inner valve portion having a nozzle end and adapted to spin within the outer valve portion, the outer valve portion having a longitudinal axis; the outer valve portion having n inlets, the inlets being directed at substantially the same location along the longitudinal axis of the outer valve portion; the inner valve portion having x chambers being at substantially the same location along the longitudinal axis of the outer valve portion as the inlets, and the chambers of sufficient size so as to be in fluid conductive alignment with less than all of the inlets at any point along the rotation of the inner valve portion within the outer valve portion, wherein n is an integer greater than one and n−x is a positive integer of one or more; and each chamber having a fluid conduit adapted to conduct a fluid to the nozzle end of the inner valve portion; and (2) a motor connected to the inner valve portion and adapted to spin the inner valve portion within the outer valve body.

The valves used in this dispensing apparatus of the present invention may be any of those described above.

BRIEF DESCRIPTION OF THE DRAWINGS

FIG. 9A is a cross-section view of an inner valve body taken along line A—A of FIG. 9, in accordance with one embodiment of the present invention.

FIG. 9B is a cross-section view of an inner valve body taken along line B—B of FIG. 9, in accordance with one embodiment of the present invention.

FIG. 9C is a cross-section view of an inner valve body taken along line C—C of FIG. 9, in accordance with one embodiment of the present invention.

FIG. 9D is a cross-section view of an inner valve body taken along line D—D of FIG. 9, in accordance with one embodiment of the present invention.

DETAILED DESCRIPTION OF PREFERRED EMBODIMENTS

In accordance with the foregoing summary of the invention, the following presents a detailed description of the preferred embodiments of the present invention, which are present considered to be the best mode of each.

Before discussing the preferred embodiment of the present invention which is described and illustrated in detail with reference to FIGS. 3–11B, it should be noted that, although the invention will be discussed in terms of its applicability to a tandem valve frozen food dispensing system, the broader aspects of the invention are not necessarily limited to this particular application. Although the preferred embodiment of the invention described below does offer particular advantages in the field of frozen food dispensing systems, it is felt that the adaptation and application of the invention to other fields may also be advantageous. Accordingly, the scope of the invention is not intended to be limited by the details of the preferred embodiment discussed below, but rather by the terms of the claims following this detailed description.

Figure 1:
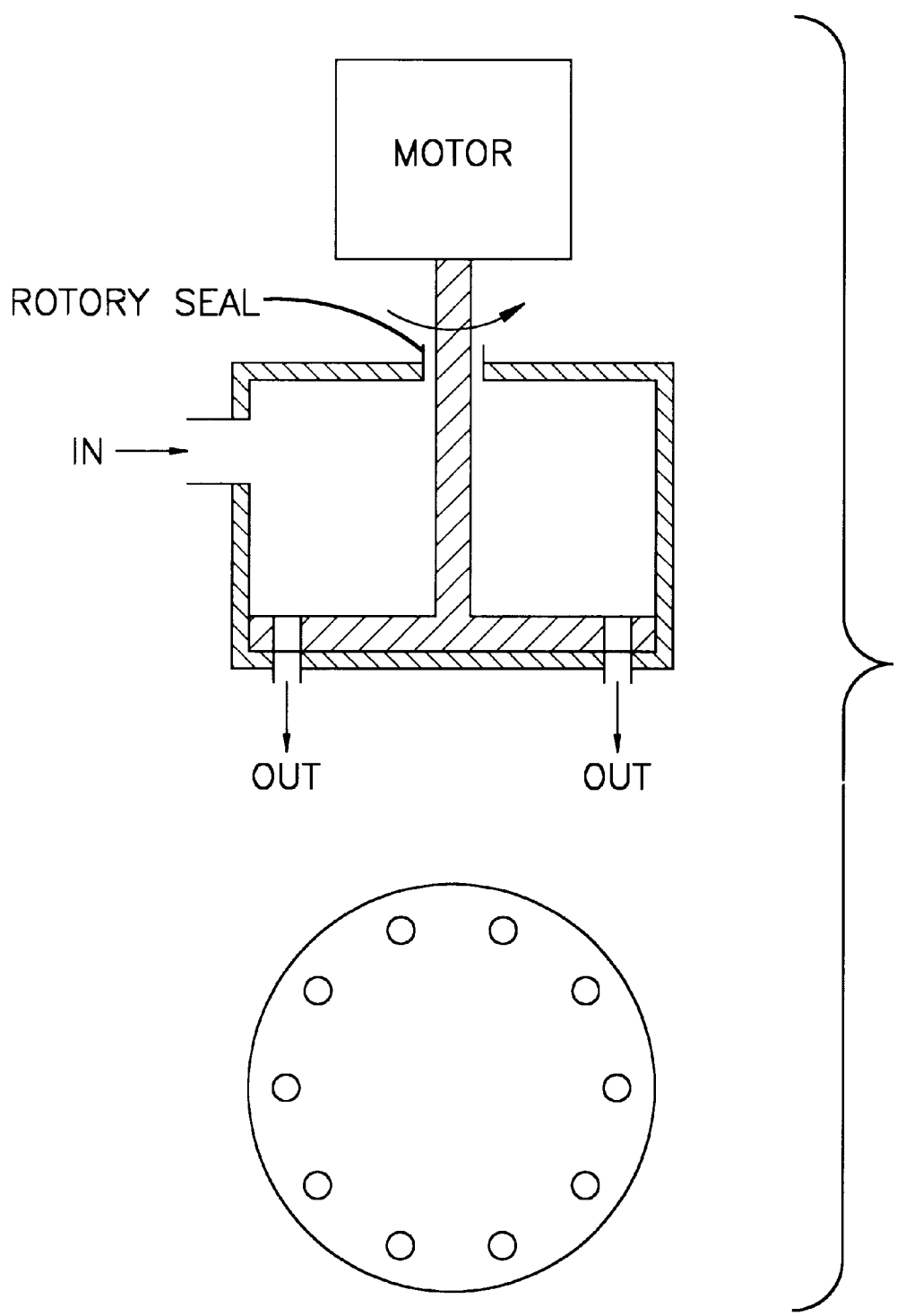
FIG. 1 is a schematic representation of a valve design in accordance with the prior art.
Figure 2:
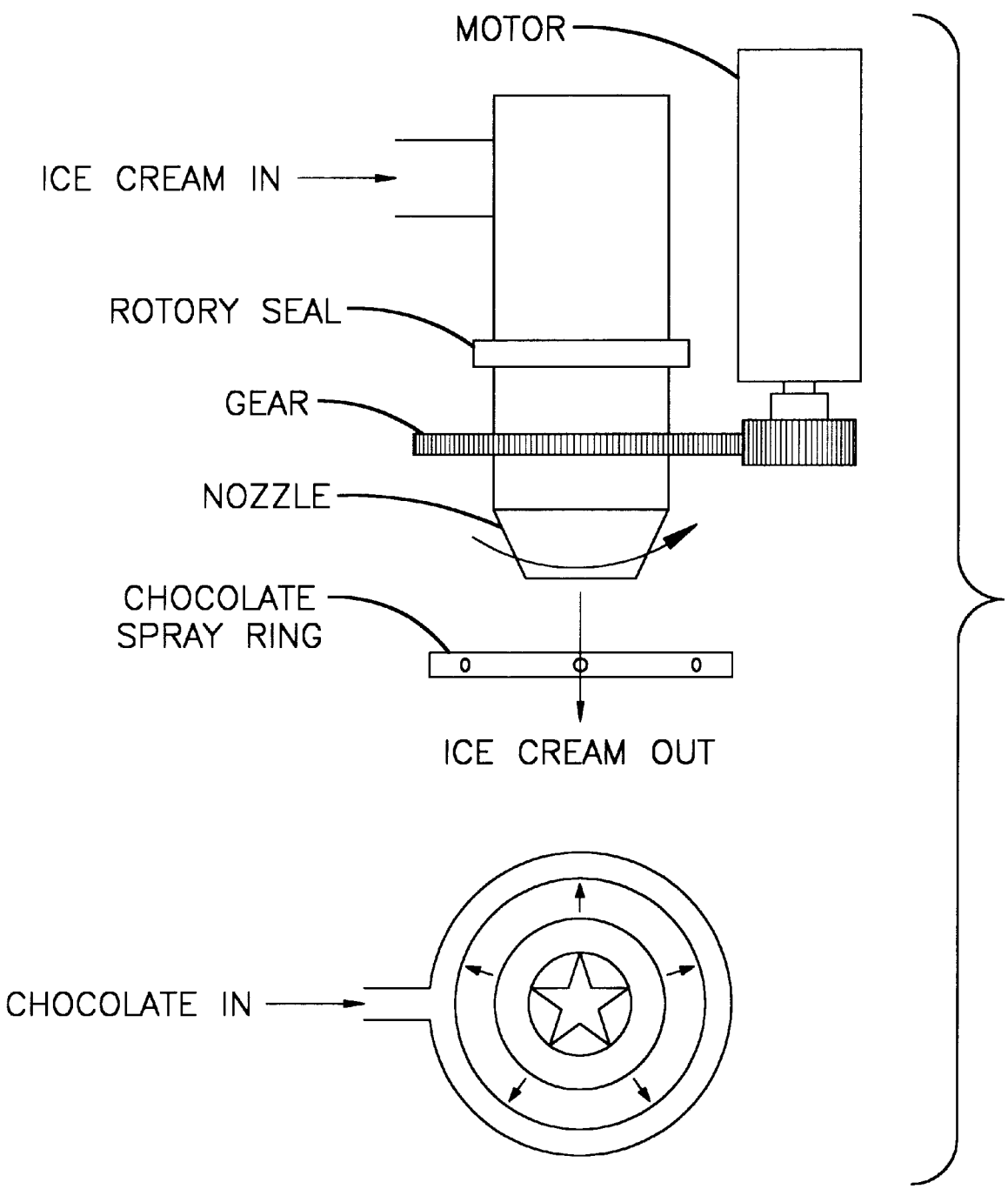
FIG. 2 is a schematic representation of a valve design in accordance with the prior art.
Figure 3:
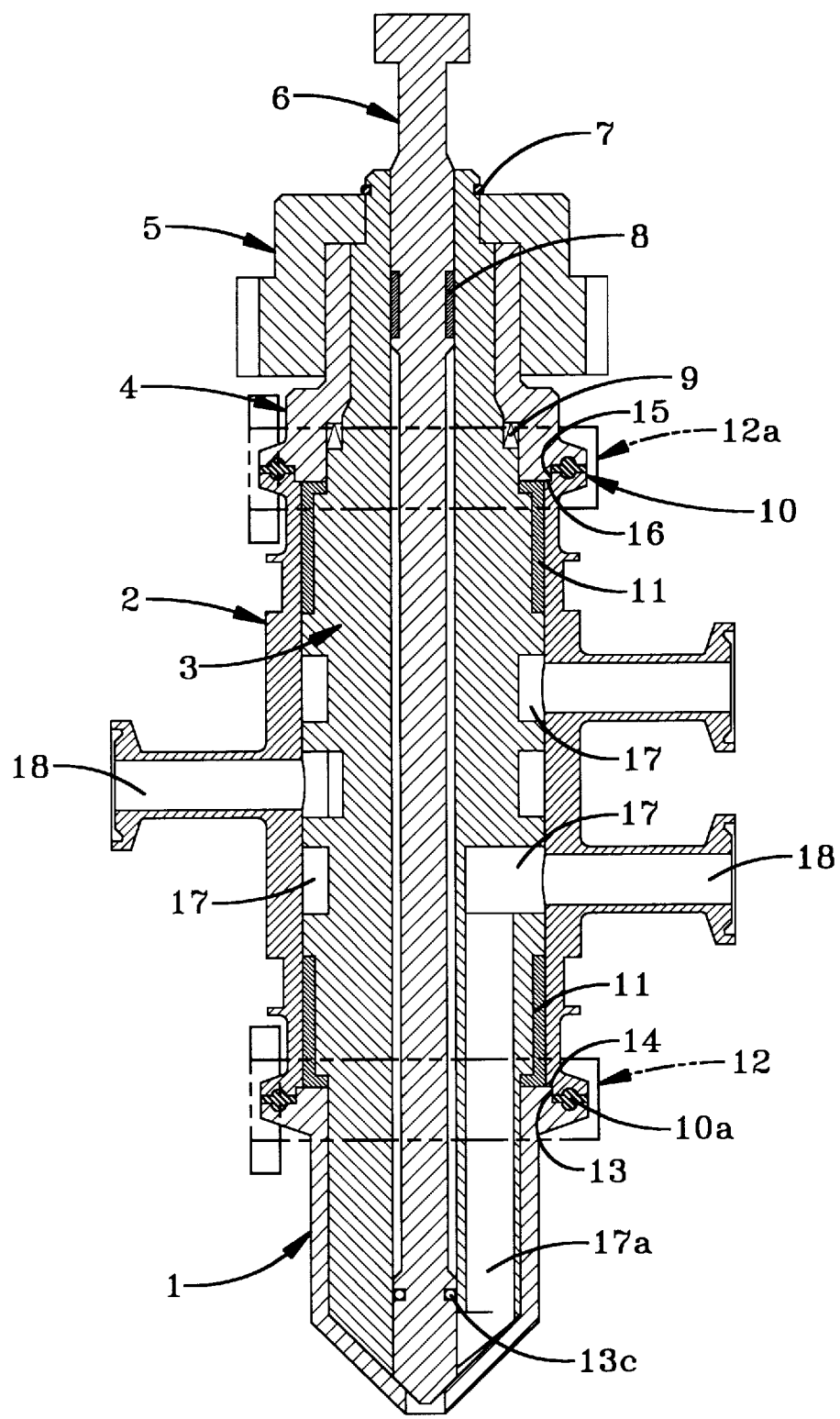
FIG. 3 is a cross-section elevation view of a spinning valve nozzle in accordance with one embodiment of the present invention.

FIG. 3 shows a cross-section elevation view of a spinning valve nozzle in accordance with one embodiment of the present invention. FIG. 3 shows the nozzle portion 1 of the outer valve body. Nozzle portion 1 is connected to a central portion 2 of the outer valve body by hand clamp 12 (shown in phantom; i.e., a two-inch "Ladish" clamp no. 13MHLA). This connection is mediated by gasket 10a (i.e., a two-inch "Ladish" 40MP-X). Nozzle portion 1 and center portion 2 are respectively provided with abutting shoulders 13 and 14 which cooperate to maintain these portions in an attached relationship so as to preserve the overall length of the outer valve body once assembled while maintaining gasket 10a and a compressed state. In similar fashion, top portion 4 of the outer valve body is attached to center portion 2, which attachment is fixed by cooperation of shoulders 15 and 16. The shoulders cooperate to maintain the top and central portions and a fixed-length relationship while maintaining gasket 10 in a day compressed state. This portion of the assembly is held together by hand clamp 12a shown in phantom.

The outer valve body contains inner valve body 3. Inner valve body 3 is held in place by the outer valve body so as to be able to spin within it. The inner valve body 3 is provided with bearings 11 and a seal 9 (i.e., such is a Parker Flexiseal FS#17498; proj. .1079).

The inner valve body 3 is provided with two or more annular or arcuate chambers 17 each aligned with respect to an inlet port 18. Each chamber 17 is provided with at least one fluid conduit (such as 17a) which extends parallel to the longitudinal axis of the inner valve body to the nozzle end of the outer valve body. These conduits discretely direct the fluid food product entering chamber 17 from inlet 18 to the nozzle to be dispensed into a container. The chambers 17 are arranged so that the individual fluid food product streams from each inlet port 18 are provided to the nozzle end of the valve without being mixed together.

Inner valve body 3 is provided with the central bore into which extends plunger 6. Plunger 6 is provided with piston seal 13c (Parker #5036PDPY 003 N1069) and bearing 8. Plunger 6 serves to open and close the valve between registrations of the food product containers in series beneath it. As plunger 6 opens the valve during each filling cycle, the spinning inner valve body 3 supplies the opened nozzle with a flow of a multi-part flow (i.e., a three-part flow) of the fluid food product components. Examples may include multi-part flows of different ice cream flavors (such as three ice cream flavors) or multi-part flows of ice cream flavors and syrup (such as a flow of two ice cream flavors and one syrup). Plunger 6 may be actuated by any appropriate mechanical means, such as a cam gear driven by a motor and appropriately timed to be synchronized with the advance and registration of each container to be filled, in accordance with mechanical arrangements known and used in the art.

Figure 3A:
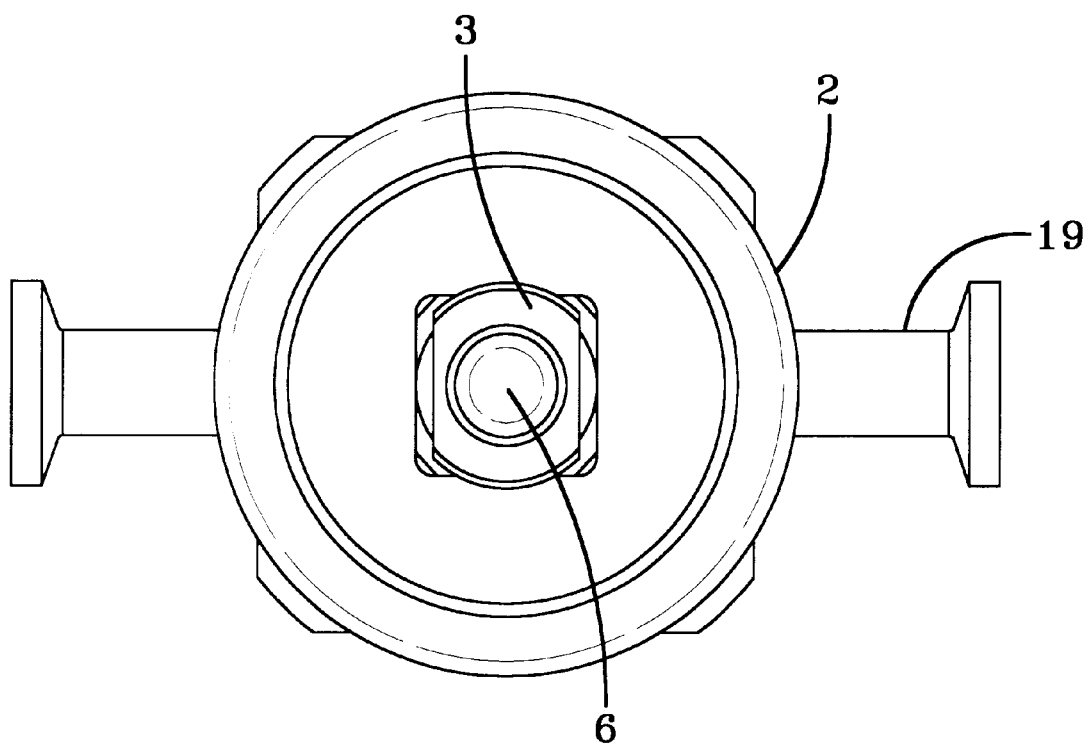
FIG. 3A is a top view of the valve shown in FIG. 3, in accordance with one embodiment of the present invention.

The inner valve body is turned by action of valve gear 5 which engages the portion of the inner valve body extending from the outer valve body. Valve gear 5 spins about the top outer body portion 4, and has a central aperture having at least one flattened portion so as to be adapted to engage a correspondingly shaped portion of the inner valve body extending from the outer valve body. This can be more clearly seen in FIG. 3A which shows the top portion of inner valve body 3 having two flattened sides. Valve gear 5 is also held in position by O-ring 7 (Parker #3-116).

Depending upon the desired food product pattern to be achieved, the chambers 17 may be formed as arcuate chambers that do not extend completely about the circumference of the inner valve body portion 3. Taking into account the arrangement of the inlet ports 18 about the circumference of the outer valve body portion, arcuate chambers may be arranged so as to form a layered food product by dispensing discrete streams of the individual components of the multi-part product flow as the inner valve portion spins during a given fill cycle. For instance, three individual streams may be dispensed in discrete layers in series, or the three individual streams may be dispensed in discrete combinations, such as stream 1/stream 2 followed by stream 1/stream 3 followed by stream 2/stream 3.

Figure 3B:
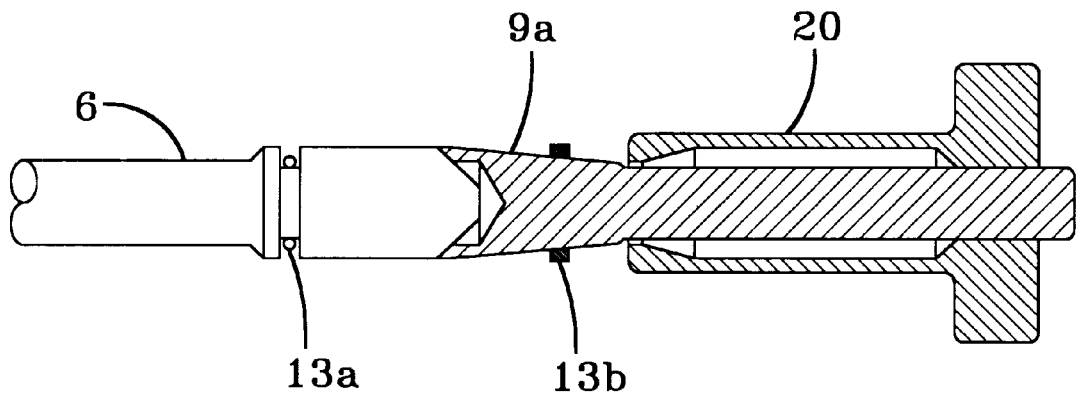
FIG. 3B is a partially sectioned detailed view showing a portion of plunger and a pusher tool for use in the piston seal assembly, in accordance with one embodiment of the present invention.

FIG. 3B is a detailed view showing a portion of plunger (3 and showing a pusher tool 20 for use in the piston seal assembly. To assemble the piston seal, all of the gland hardware, seal components and installation tools are cleaned and lubricated. The O-ring 13a is placed into the groove provided in plunger 6. The Teflon seal ring 13b is placed on loading mandrel 9a. The pusher tool 20 is slid over the back of mandrel 9a. The plunger 6 is placed into mandrel 9 as shown and the pusher tool 20 is used to slide the seal ring into place.

To assemble the valve, the bearing locations on the inner valve body 3 are first lubricated. The nozzle portion 1 is clamped to the central valve body 2. The bearings are slid onto the inner valve portion 3, and the inner valve portion is inserted into the dollar valve body. Seal 9 is placed into the top portion 4, and the portion is clamped onto the central body portion 2. The bearing surface of the top portion 4 is then located and valve gear 5 and O-ring 7 are installed. Bearing 8 is snapped onto plunger 6, and the plunger is inserted into the inner valve body 3 using a twisting motion. The piston seal may be removed by pitching the seal to push one side of the seal out of the groove so they may be cut.

The valve shown in FIG. 3 is therefore designed to provide 3 discrete layers of a food product into the container.

Figure 4:
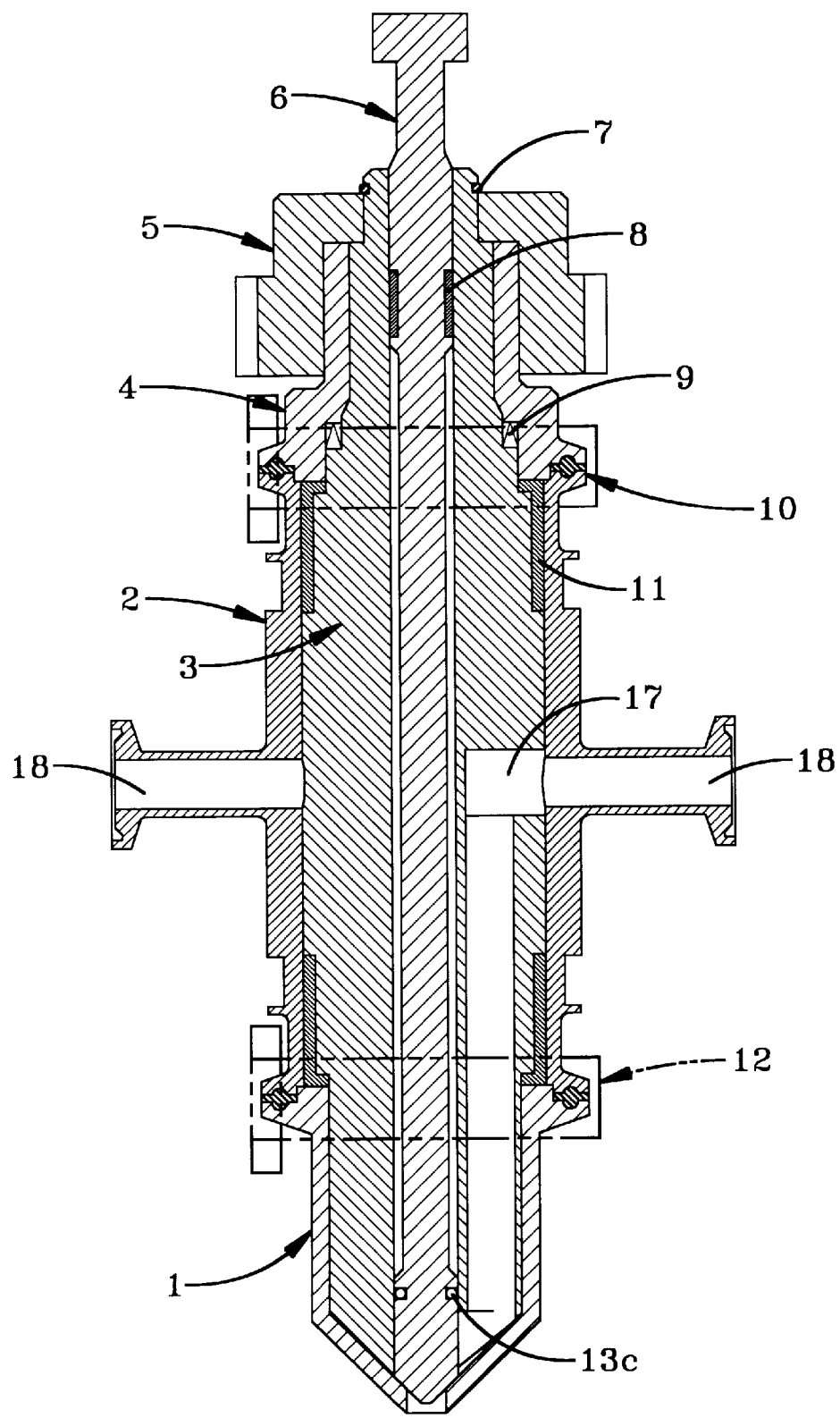
FIG. 4 is a cross-section elevation view of a spinning valve nozzle in accordance with one embodiment of the present invention.

FIG. 4 shows an alternative embodiment of the valve of the present invention. FIG. 4 has all of the components as described with respect to the embodiment of FIG. 3 (with like reference numerals) with the exception that the central outer valve body portion 2 is provided with only two inlets 18 arranged in opposition at the same location along the longitudinal axis of the valve. The inner valve portion 3 in this embodiment is provided with a semi-annular single chamber 17 aligned with the two inlet ports 18, so as to accept a flow of a fluid product from each inlet port in series during a given fill cycle. The arc of the chamber 17 is 180 degrees to provide for sequential dispensing of the fluid food product. The valve shown in FIG. 4 is therefore capable of providing discrete layers of the fluid food product supplied into inlets 18.

Figure 4A:
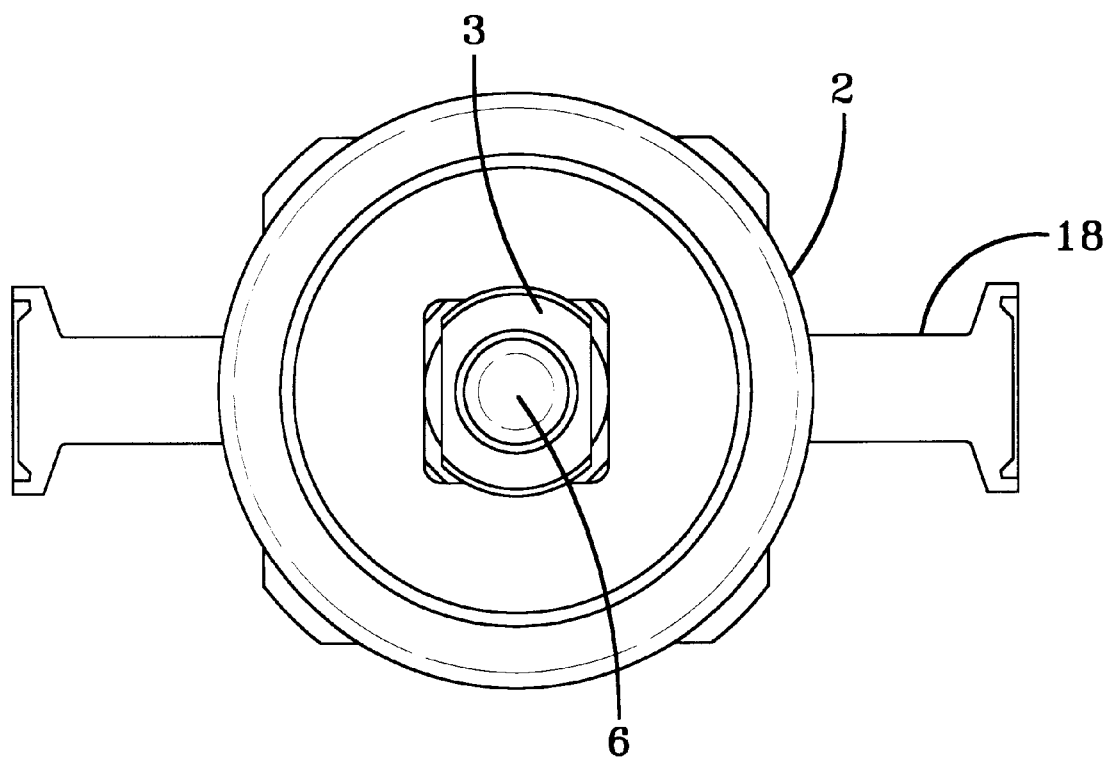
FIG. 4A is a top view of the valve shown in FIG. 4, in accordance with one embodiment of the present invention.

FIG. 4A is a top view of the valve shown in FIG. 4. The inner valve body is turned by action of valve gear 5 which engages the portion of the inner valve body extending from the outer valve body. Valve gear 5 spins about the top outer body portion 4, and has a central aperture having at least one flattened portion so as to be adapted to engage a correspondingly shaped portion of the inner valve body extending from the outer valve body. This can be more clearly seen in FIG. 4A which shows the top portion of inner valve body 3 having two flattened sides. Valve gear 5 is also held in position by O-ring 7 (Parker #3116).

Figure 5:
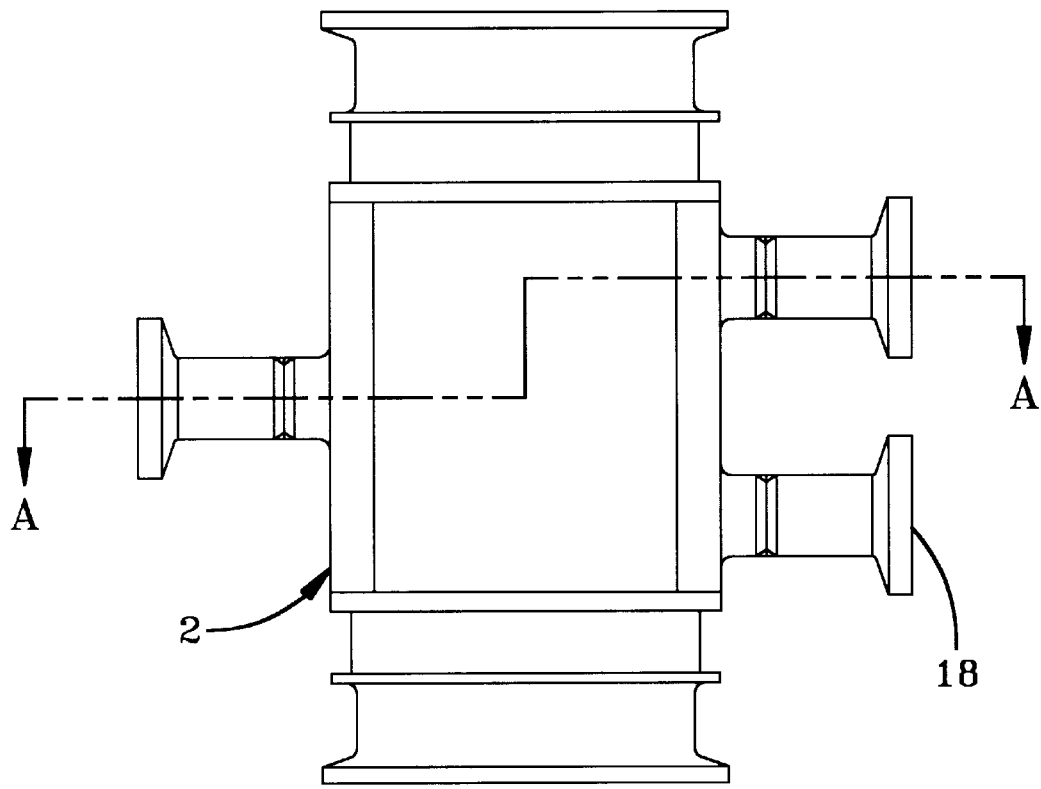
FIG. 5 is an elevational view of the central outer valve body portion 2 such as may be used in the embodiment shown in FIG. 3, in accordance with one embodiment of the present invention.

FIG. 5 is an elevational view of the central outer valve body portion 2 such as may be used in the embodiment shown in FIG. 3. FIG. 5 shows 3 product inlets 18 (shown with tri-clover ferrule). Where two or more inlets are used, it is preferred that they be arranged in opposition as shown in FIG. 5 in order to provide the most convenient arrangement when the valves are used in tandem, in order that the food product lines can be best accommodated and provided access to the product inlets 18.

Figure 5A:
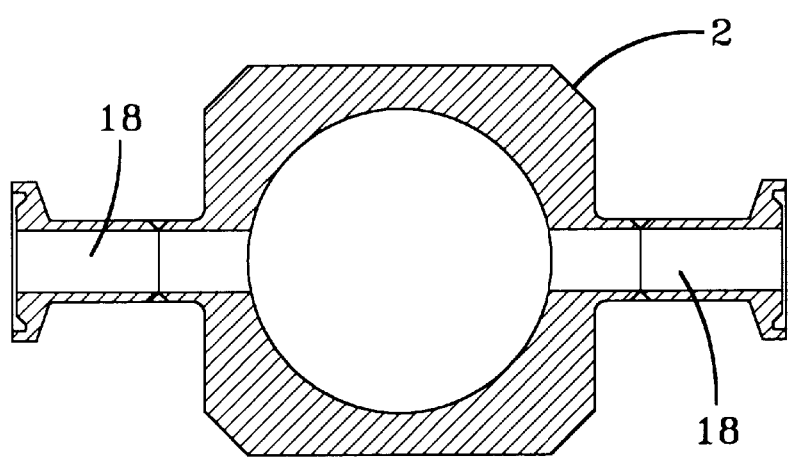
FIG. 5A is a view along the longitudinal axis of central outer valve body portion shown in FIG. 5, taken along line A—A of FIG. 5, in accordance with one embodiment of the present invention.

FIG. 5A is a view along the longitudinal axis of central outer valve body portion shown in FIG. 5 (shown with tri-clover ferrule), taken along line A—A of FIG. 5.

Figure 5B:
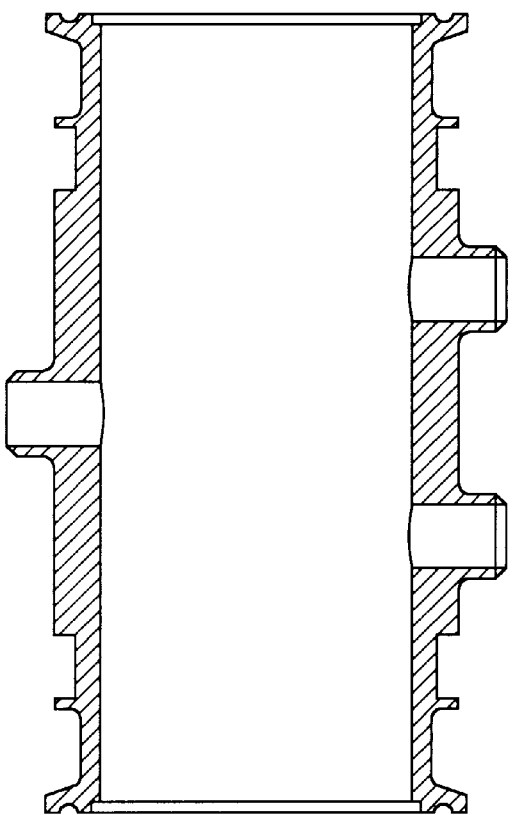
FIG. 5B is a sectioned view of the central outer valve body portion of FIG. 5, taken along line B—B of FIG. 5D, in accordance with one embodiment of the present invention.
Figure 5C:
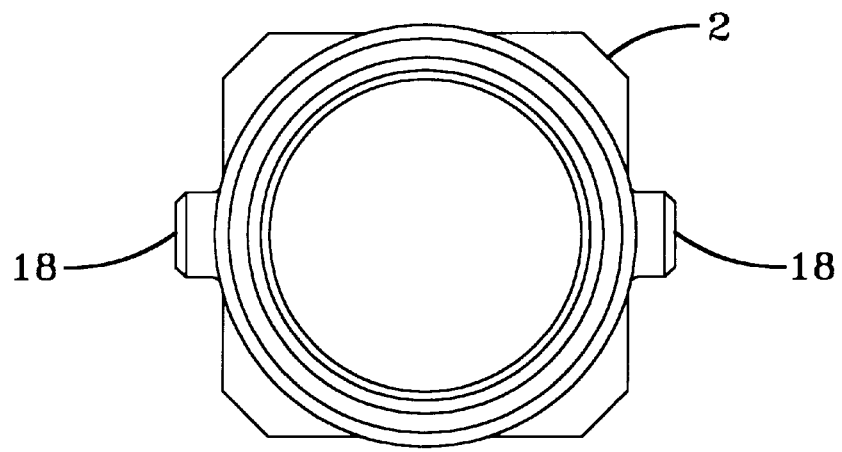
FIG. 5C is an end view of the central outer valve body portion of Figure 5B, in accordance with one embodiment of the present invention.
Figure 5D:
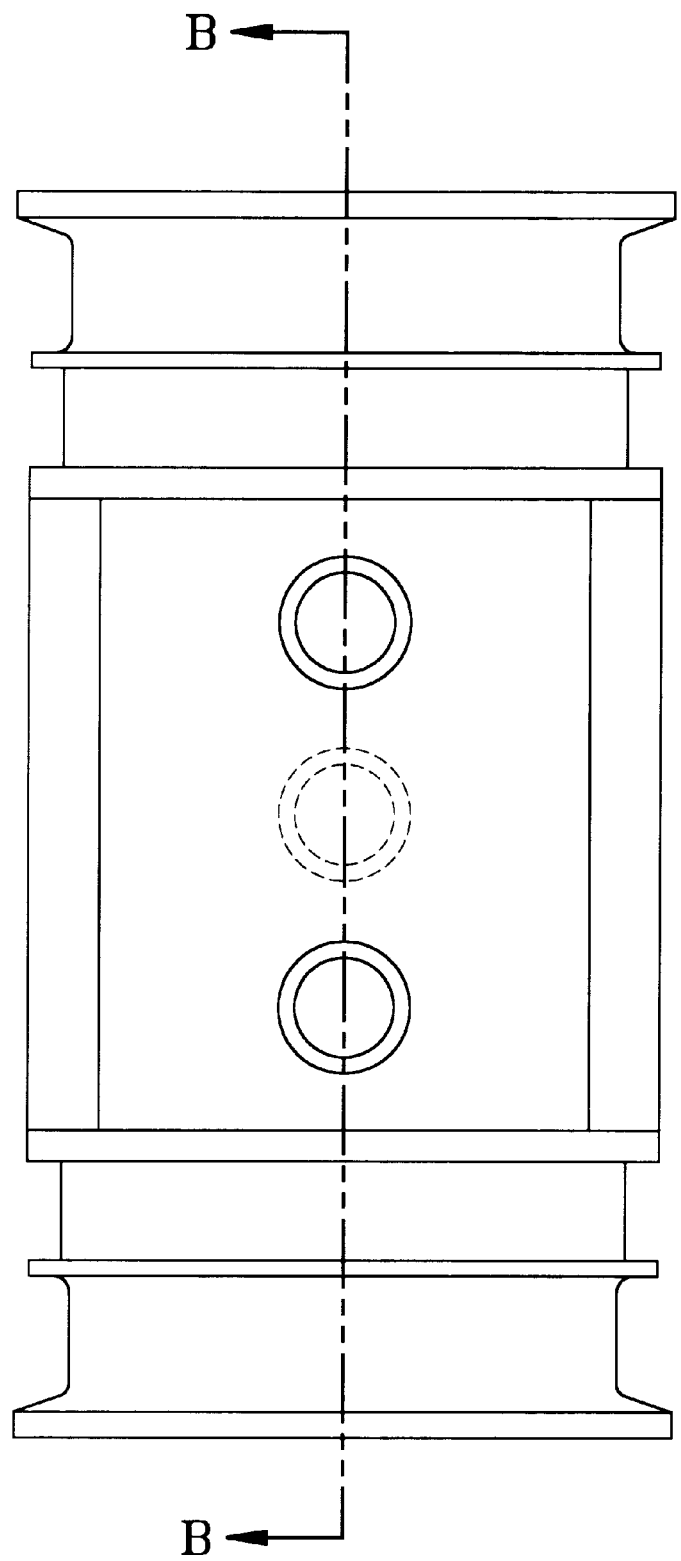
FIG. 5D is a side elevational view of the central outer valve body portion of FIG. 5, in accordance with one embodiment of the present invention.

FIG. 5B is a section to view of the central outer valve body portion of FIG. 5 (shown without tri-clover ferrule), taken along line B—B of FIG. 5D.

FIG. 5C is an end view of the central outer valve body portion of FIG. 5B (shown without tri-clover ferrule).

FIG. 5D is a side elevational view of the central outer valve body portion of FIG. 5 (shown without tri-clover ferrule).

Figure 6:
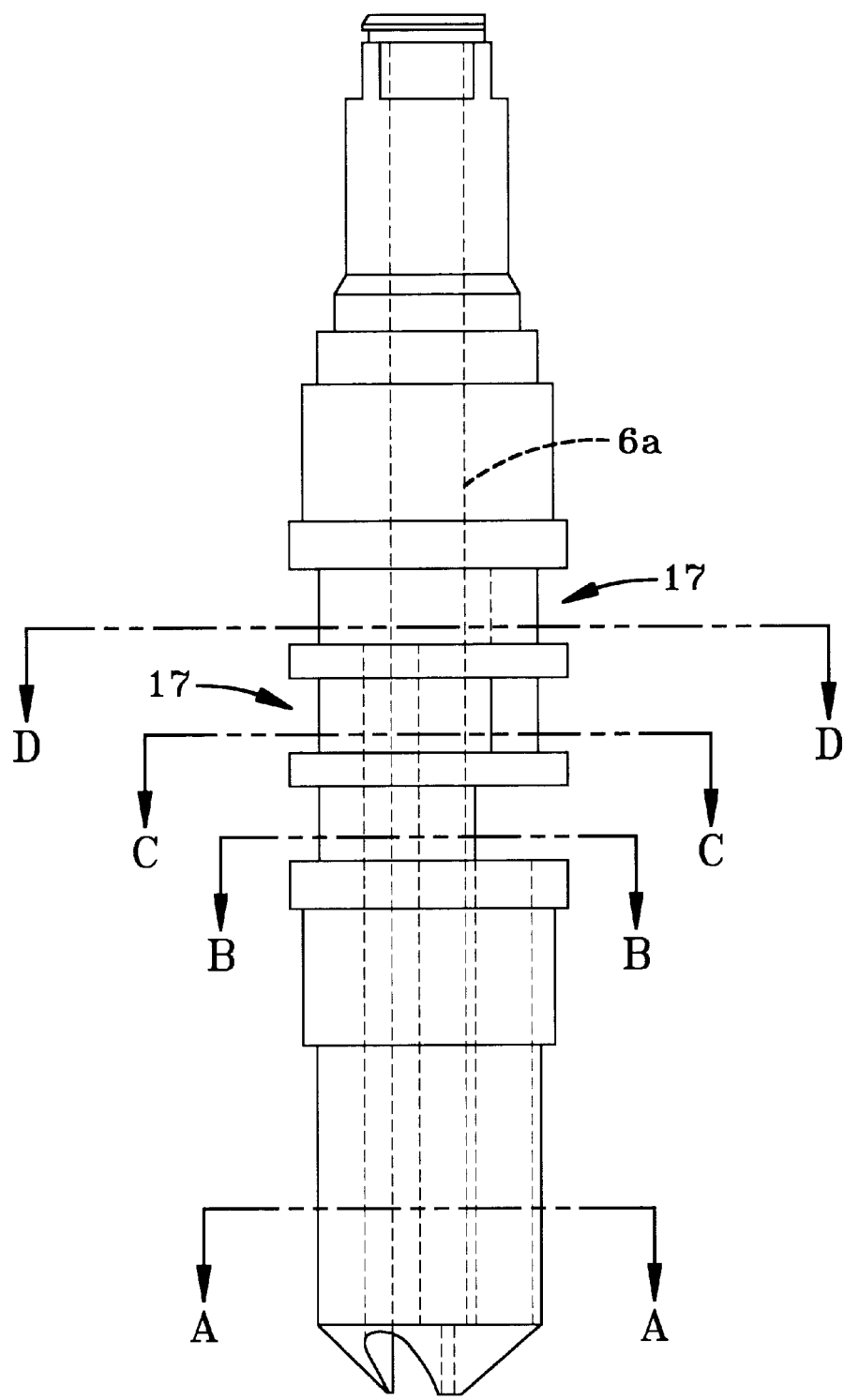
FIG. 6 is a side elevational view of the inner valve body such as may be used in the embodiment shown in FIG. 3, in accordance with one embodiment of the present invention.

FIG. 6 is a side elevational view of the inner valve body such as may be used in the embodiment shown in FIG. 3. FIG. 6 shows chambers 17 and center bore 6a. The chambers 17 in this embodiment are opened to access by their corresponding inlets 18 throughout the turning cycle of the inner valve body.

Figure 6A:
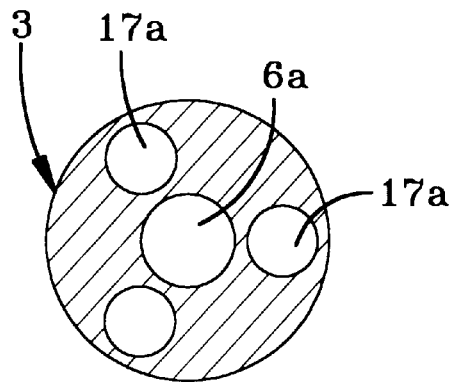
FIG. 6A is a cross-section view of the inner valve body 3 taken along line A—A of FIG. 6, in accordance with one embodiment of the present invention.

FIG. 6A is a cross-section view of inner valve body 3 taken along line AA of FIG. 6. FIG. 6A shows longitudinal conduits 1 7a and center bore 6a.

Figure 6B:
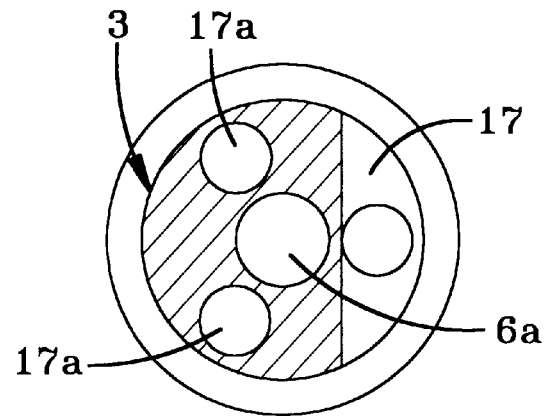
FIG. 6B is a cross-section view of the inner valve body 3 taken along line B—B of FIG. 6, in accordance with one embodiment of the present invention.

FIG. 6B is a cross-section view of inner valve body 3 taken along line B—B of FIG. 6. FIG. 6B shows one of the chambers 17, longitudinal conduits 17a and center bore 6a.

Figure 6C:
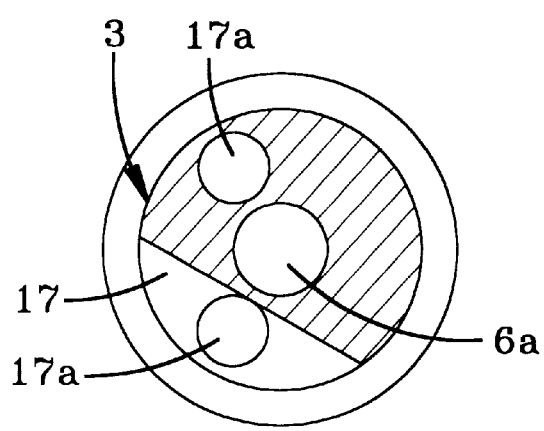
FIG. 6C is a cross-section view of the inner valve body 3 taken along line C—C of FIG. 6, in accordance with one embodiment of the present invention.

FIG. 6C is a cross-section view of inner valve body 3 taken along line C—C of FIG. 6. FIG. 6C shows one of the chambers 17, longitudinal conduits 17a and center bore 6a.

Figure 6D:
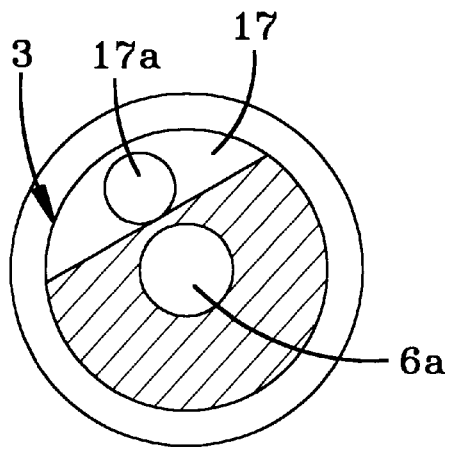
FIG. 6D is a cross-section view of the inner valve body 3 taken along line D—D of FIG. 6, in accordance with one embodiment of the present invention.

FIG. 6D is a cross-section view of inner valve body 3 taken along line D—D of FIG. 6. FIG. 6D shows one of the chambers 17, longitudinal conduit 17a and center bore 6a.

Figure 6E:
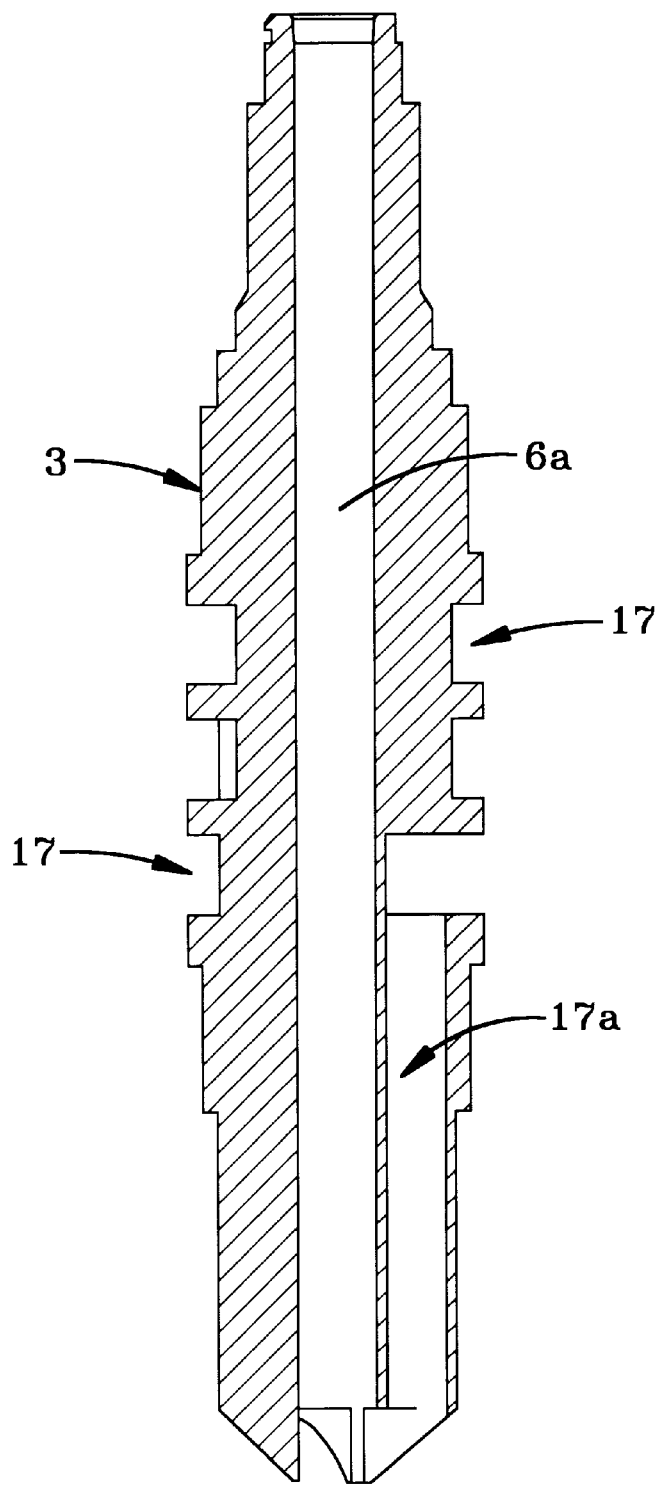
FIG. 6E is a longitudinal cross-section taken along line E—E of FIG. 6F.
Figure 6F:
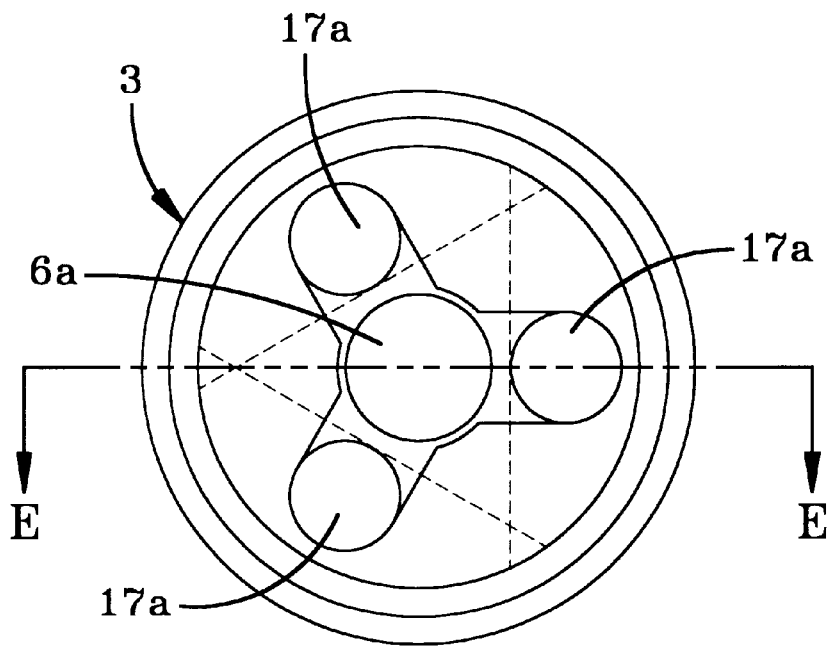
FIG. 6F is a bottom view of inner valve body 3 shown in FIG. 6, in accordance with one embodiment of the present invention.

FIG. 6E is a longitudinal cross-section taken along line E—E of FIG. 6F of the inner valve body such as may be used in the embodiment shown in FIG. 3. FIG. 6E shows inner valve body 3 and chambers 17 each of which is provided with a longitudinal conduit such as 17a. In this embodiment, each chamber 17 extends about the circumference of the inner valve body, such that the fluid food product flow is continuously supplied to each of the chambers of the inner valve body 3 as it turns completely during each filling cycle. This is shown more clearly in the cross sections shown in FIGS. 6B, 6C and 6D. FIG. 6E also shows the center bore 6a into which plunger 6 extends. Plunger 6 reciprocates within center bore 6a to open and close the valve at the nozzle end during each filling cycle. It will be noted that a substantial portion of the area defined in the cross sections must remain accessible to the food product in order to allow for the longitudinal passage of the conduits 17a extending from other chambers, as is shown in FIGS. 6B, 6C and 6D.

FIG. 6F is a bottom view of inner valve body 3 shown in FIG. 6. FIG. 6F shows the terminal ends of the longitudinal conduits 17a that end in the nozzle portion of the valve.

Figure 6G:
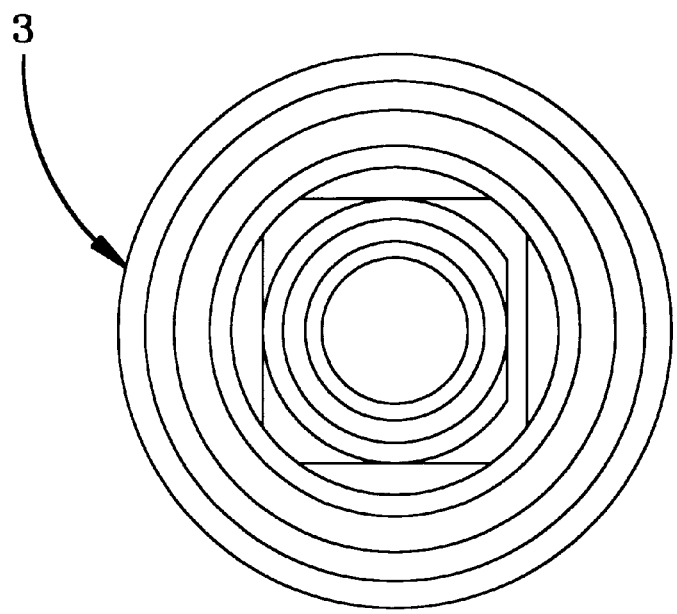
FIG. 6G is a top view of the inner valve body 3 shown in FIG. 6, in accordance with one embodiment of the present invention.

FIG. 6G is a top view of inner valve body 3 shown in FIG. 6. Figure 6G also shows the flattened portions of the top of the inner valve body 3 which are adapted to engage a correspondingly shaped aperture in a nylon gear.

Figure 7:
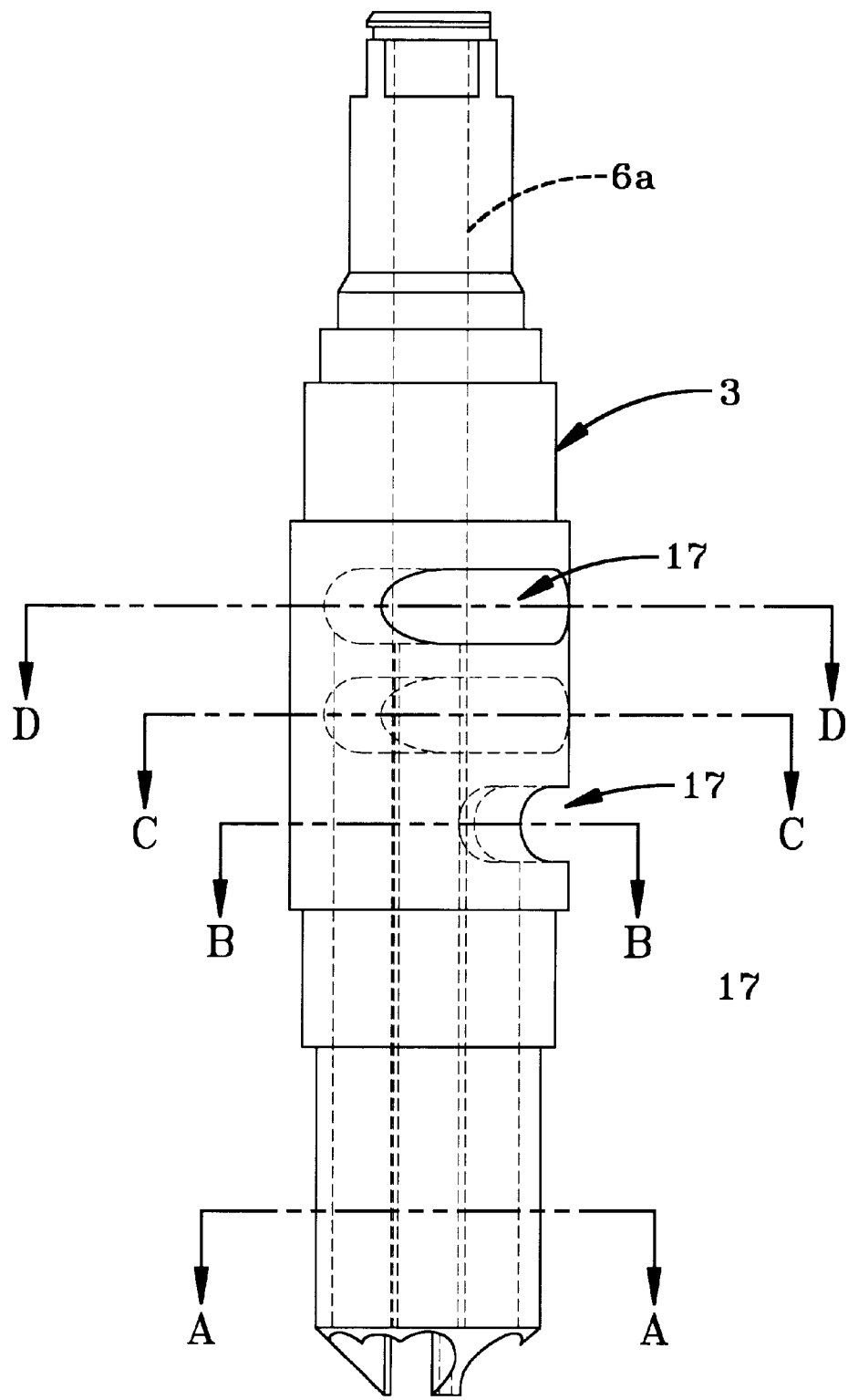
FIG. 7 is a side elevational view of an alternative inner valve body such as may be used in the embodiment shown in FIG. 3, in accordance with one embodiment of the present invention.

FIG. 7 is a side elevational view of an alternative inner valve body such as may be used in the embodiment shown in FIG. 3. FIG. 7 shows chambers 17 and center bore 6a.

Figure 7A:
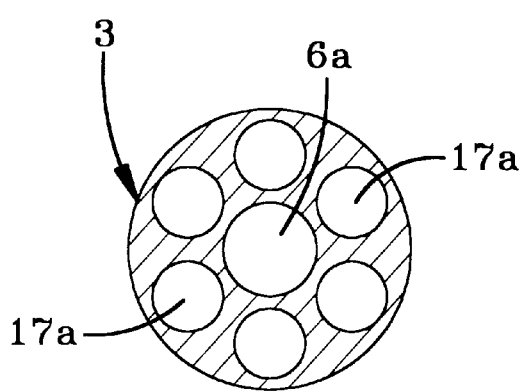
FIG. 7A is a cross-section view of the inner valve body 3 taken along line A—A of FIG. 7, in accordance with one embodiment of the present invention.

FIG. 7A is a cross-section view of inner valve body 3 taken along line A—A of FIG. 7. FIG. 7A shows longitudinal conduits 17a and center bore 6a. FIG. 7A shows that there are a total of 6 longitudinal conduits 17a with two conduits serving each of the three chambers, which is preferred in this embodiment.

Figure 7B:
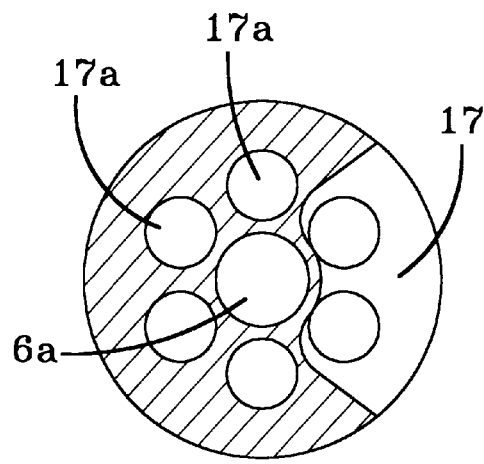
FIG. 7B is a cross-section view of the inner valve body 3 taken along line B—B of FIG. 7, in accordance with one embodiment of the present invention.

FIG. 7B is a cross-section view of inner valve body 3 taken along line B—B of FIG. 7. FIG. 7B shows one of the chambers 17, longitudinal conduits 17a and center bore 6a.

Figure 7C:
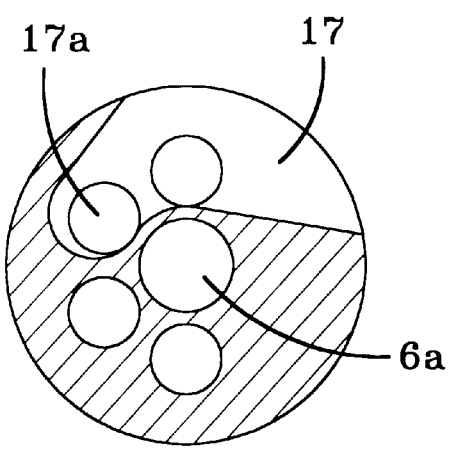
FIG. 7C is a cross-section view of the inner valve body 3 taken along line C—C of FIG. 7, in accordance with one embodiment of the present invention.

FIG. 7C is a cross-section view of inner valve body 3 taken along line C—C of FIG. 7. FIG. 7C shows one of the chambers 17, longitudinal conduits 17a and center bore 6a.

Figure 7D:
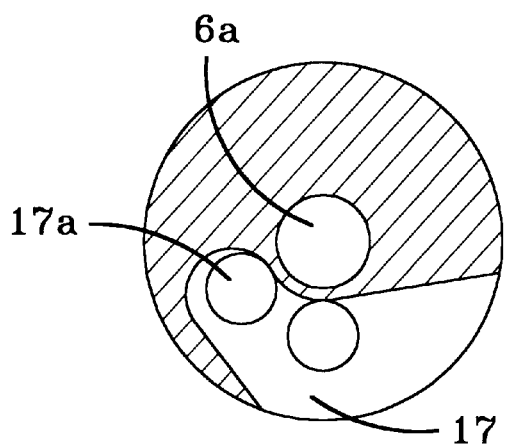
FIG. 7D is a cross-section view of the inner valve body 3 taken along line D—D of FIG. 7, in accordance with one embodiment of the present invention.

FIG. 7D is a cross-section view of inner valve body 3 taken along line D—D of FIG. 7. FIG. 7D shows one of the chambers 17, longitudinal conduit 17a and center bore 6a.

FIGS. 7B, 7C and 7D show that each of the chambers 17 are provided with two longitudinal conduits 17a and that the shape of the arcuate chambers is designed to accommodate the entrance to the two longitudinal conduits 17a while sweeping out the appropriate angle such that the valve will provide a discrete stream of the food product from each inlet, respectively, (luring one-third of its travel cycle.

Figure 7E:
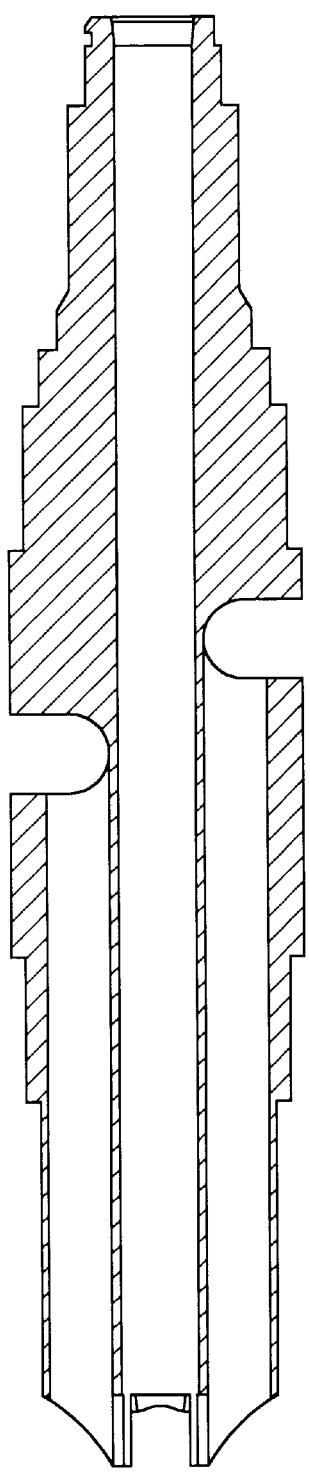
FIG. 7E is a longitudinal cross-section taken along line E—E of FIG. 7F, in accordance with one embodiment of the present invention.
Figure 7F:
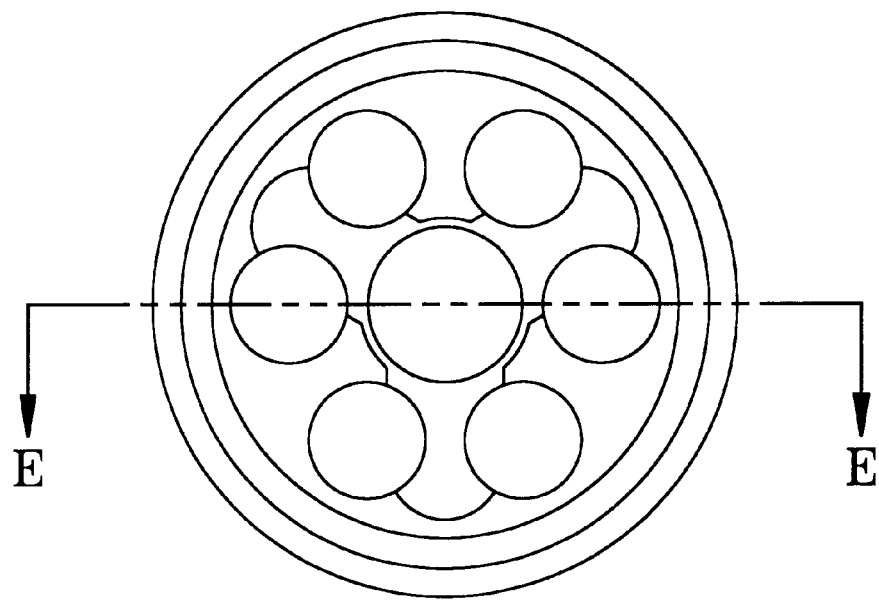
FIG. 7F is a bottom view of inner valve body 3 shown in FIG. 7, in accordance with one embodiment of the present invention.

FIG. 7E is a longitudinal cross-section taken along line E–E of FIG. 7F of the inner valve body such as may be used in the embodiment shown in FIG. 3. FIG. 7E shows inner valve body to 3 and chambers 17 each of which is provided with a longitudinal conduit such as 17a. In this embodiment, the arc of each chamber 17 is 120 degrees, and the chambers are staggered (taking into account the positions of the inlet ports about the circumference of the valve) such that the fluid food product flow is supplied in the discrete series as the inner valve body 3 turns completely during each filling cycle. FIG. 7E also shows the center bore 6a into which plunger 6 extends. Plunger 6 reciprocates within center bore 6a to open and close the valve at the nozzle end during each filling cycle.

FIG. 7F is a bottom view of inner valve body 3 shown in FIG. 7. FIG. 7F shows the terminal ends of the longitudinal conduits 17a that end in the nozzle portion of the valve.

Figure 7G:
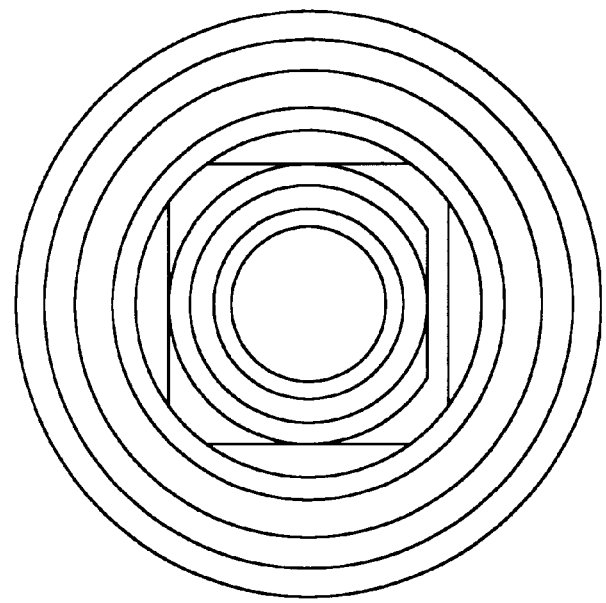
FIG. 7g is a top view of inner valve body 3 shown in FIG. 7, in accordance with one embodiment of the present invention.

FIG. 7G is another bottom view of inner valve body 3 shown in FIG. 7.

FIG. 7H is a top view of inner valve body 3 shown in FIG. 7.

Figure 8:
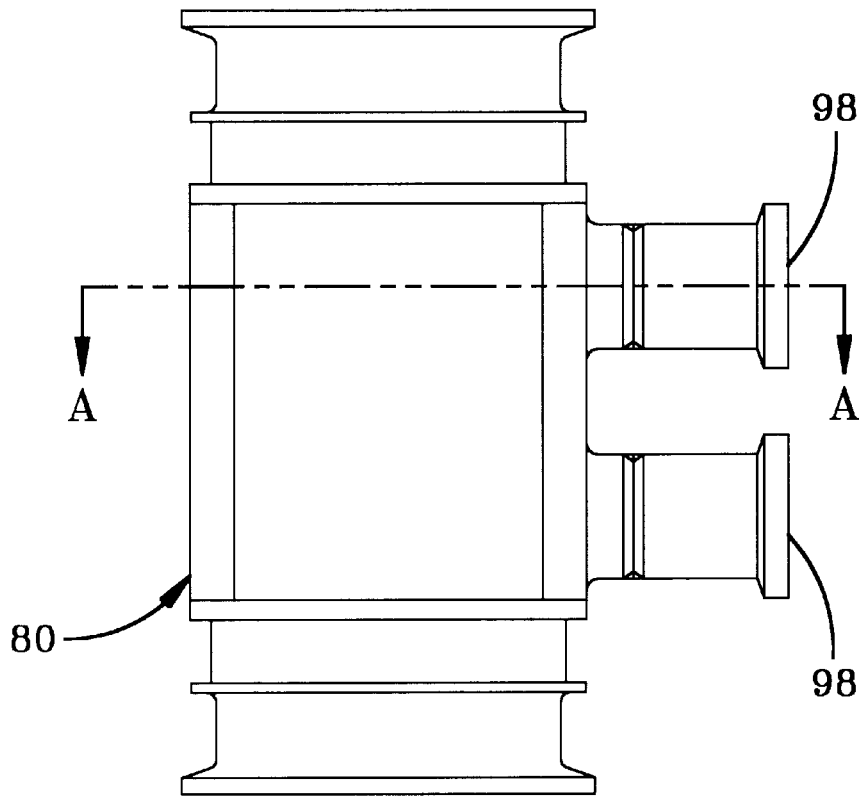
FIG. 8 is an elevational view of the central outer valve body portion 80 (shown with tri-clover ferrule) such as may be used in accordance with one embodiment of the present invention shown in FIG. 10.

FIG. 8 is an elevational view of the central outer valve body portion 80 (shown with tri-clover ferrule) such as may be used in accordance with one embodiment of the present invention. FIG. 5 shows 2 product inlets 98 (shown with tri-clover ferrule). Where two or more inlets are used, it is preferred that they be arranged in opposition as shown in FIG. 8 in order to provide the most convenient arrangement when the valves are used in tandem, in order that the food product lines can be best accommodated and provided access to the product inlets 98.

Figure 8A:
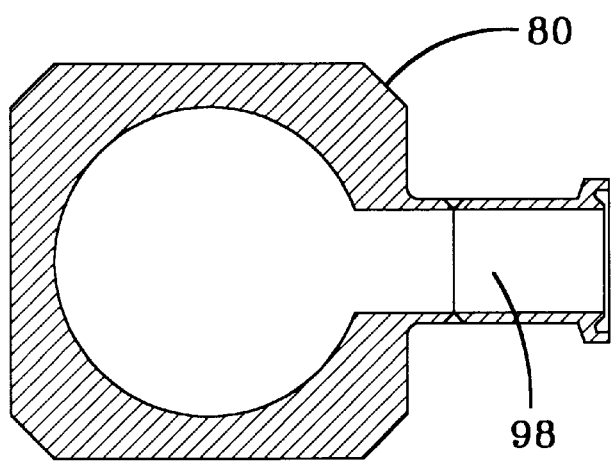
FIG. 8A is a view along the longitudinal axis of the central outer valve body portion shown in FIG. 8, taken along line A—A of FIG. 8, in accordance with one embodiment of the present invention.

FIG. 8A is a view along the longitudinal axis of central outer valve body portion shown in FIG. 8, taken along line A—A of FIG. 8, in accordance with one embodiment of the present invention.

Figure 8B:
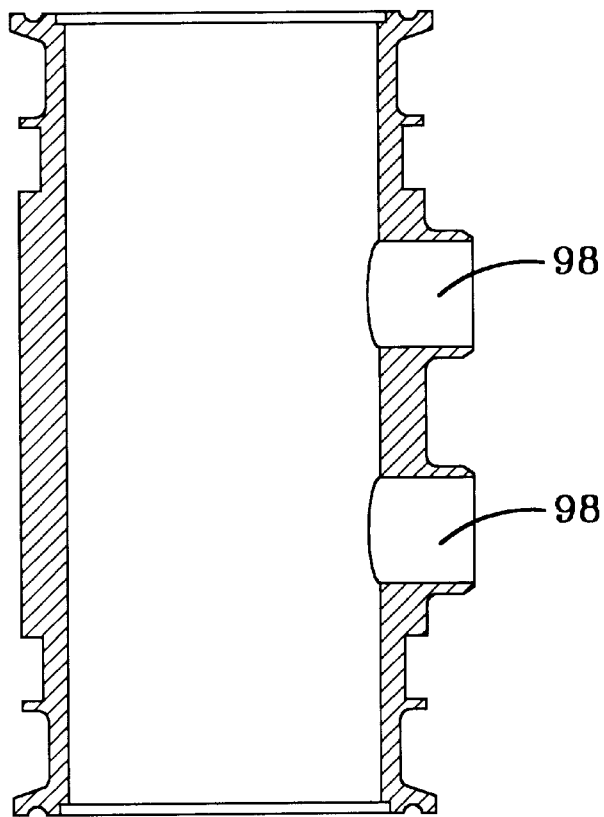
FIG. 8B is a sectioned view of the central outer valve body portion of FIG. 8 (shown without tri-clover ferrule), taken along line B—B of FIG. 8D, in accordance with one embodiment of the present invention.
Figure 8C:
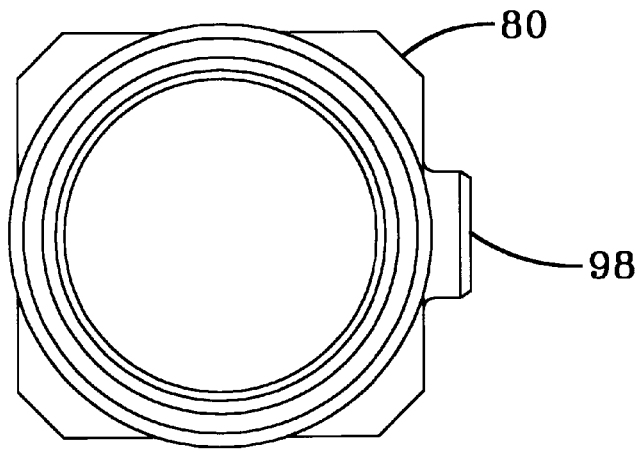
FIG. 8C is an end view of the central outer valve body portion of FIG. 5B, in accordance with one embodiment of the present invention.
Figure 8D:
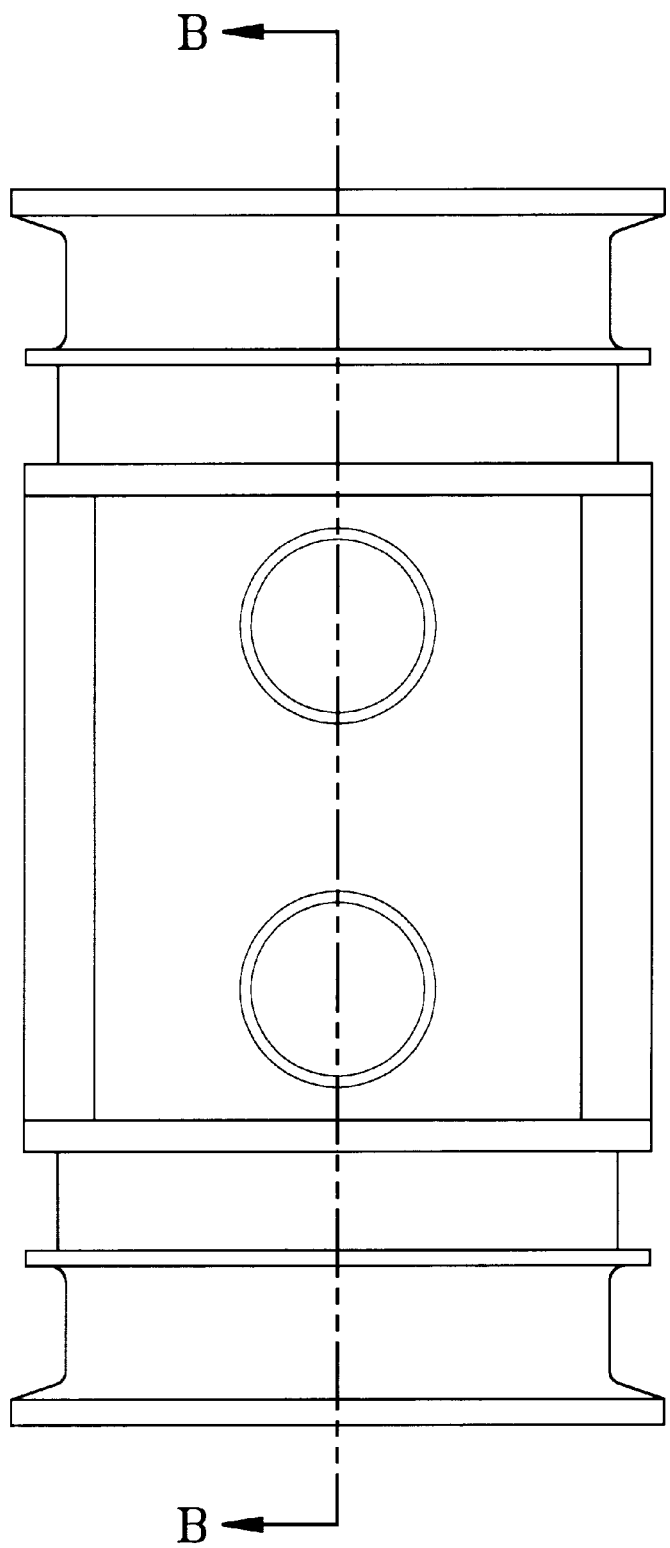
FIG. 8D is a side elevational view of the central outer valve body portion of FIG. 8 (shown without tri-clover ferrule), in accordance with one embodiment of the present invention.

FIG. 8B is a sectioned view of the central outer valve body portion of FIG. 8 (shown without tri-clover ferrule), taken along line B—B of FIG. 8D, in accordance with one embodiment of the present invention.

FIG. 8C is an end view of the central outer valve body portion of FIG. 5B (shown without tri-clover ferrule), in accordance with one embodiment of the present invention.

FIG. 8D is a side elevational view of the central outer valve body portion of FIG. 8 (shown without tri-clover ferrule), in accordance with one embodiment of the present invention.

Figure 9:
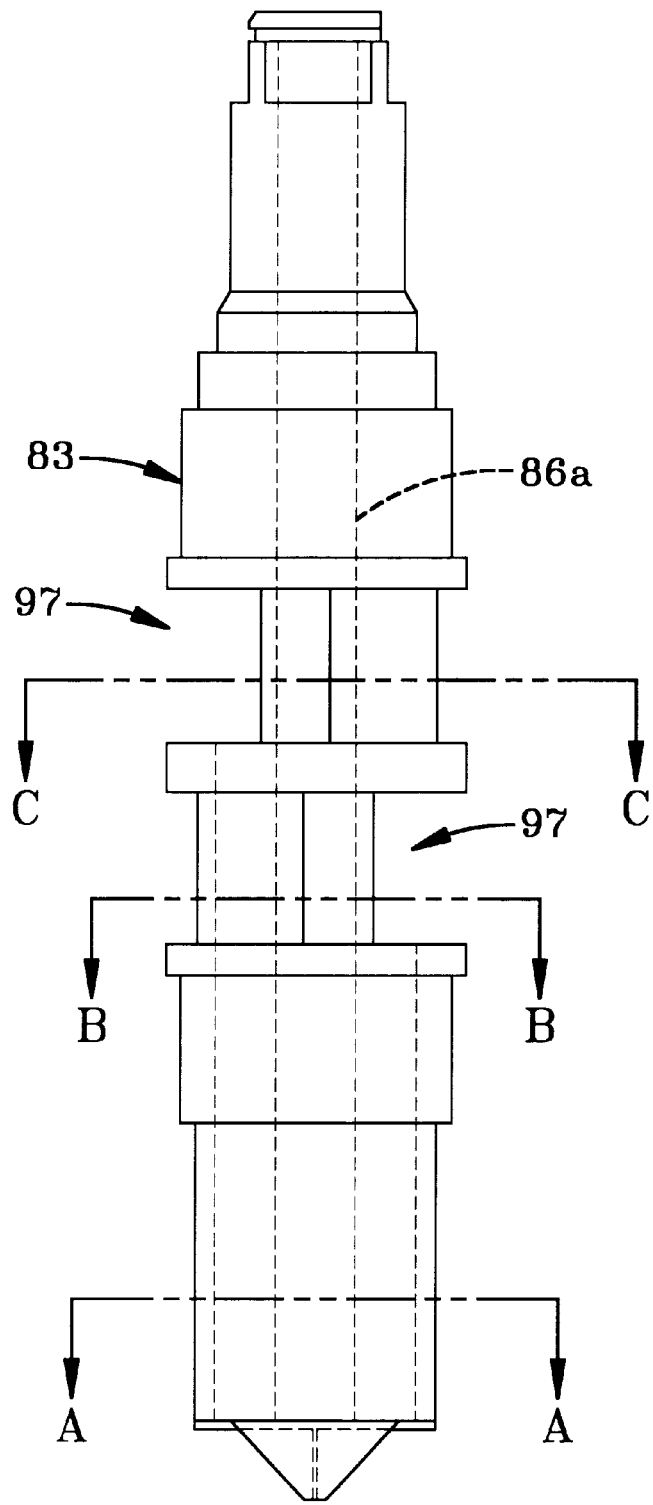
FIG. 9 is a side elevational view of the inner valve body, such as may be used in the embodiment shown in FIG. 8, in accordance with one embodiment of the present invention.

FIG. 9 is a side elevational view of the inner valve body such as may be used in the embodiment shown in FIG. 8, in accordance with one embodiment of the present invention.

FIG. 9 shows two chambers 97 and center bore 86a. The chambers 97 in this embodiment are opened to access by their corresponding inlets 98 throughout the turning cycle of the inner valve body.

FIG. 9A is a cross-section view of an inner valve body taken along line A—A of FIG. 9, in accordance with one embodiment of the present invention. FIG. 9A shows longitudinal conduits 97a and center bore 86a. FIG. 9A shows that there are a total of 4 longitudinal conduits 97a with two conduits serving each of the two chambers, which is preferred in this embodiment.

FIG. 9B is a cross-section view of an inner valve body taken along line B—B of FIG. 9, in accordance with one embodiment of the present invention. FIG. 9B shows one of the chambers 97, longitudinal conduits 97a and center bore 86a.

FIG. 9C is a cross-section view of an inner valve body taken along line C—C in FIG. 9, in accordance with one embodiment of the present invention. FIG. 9C shows one of the chambers 97, longitudinal conduits 97a and center bore 86a

Figure 9E:
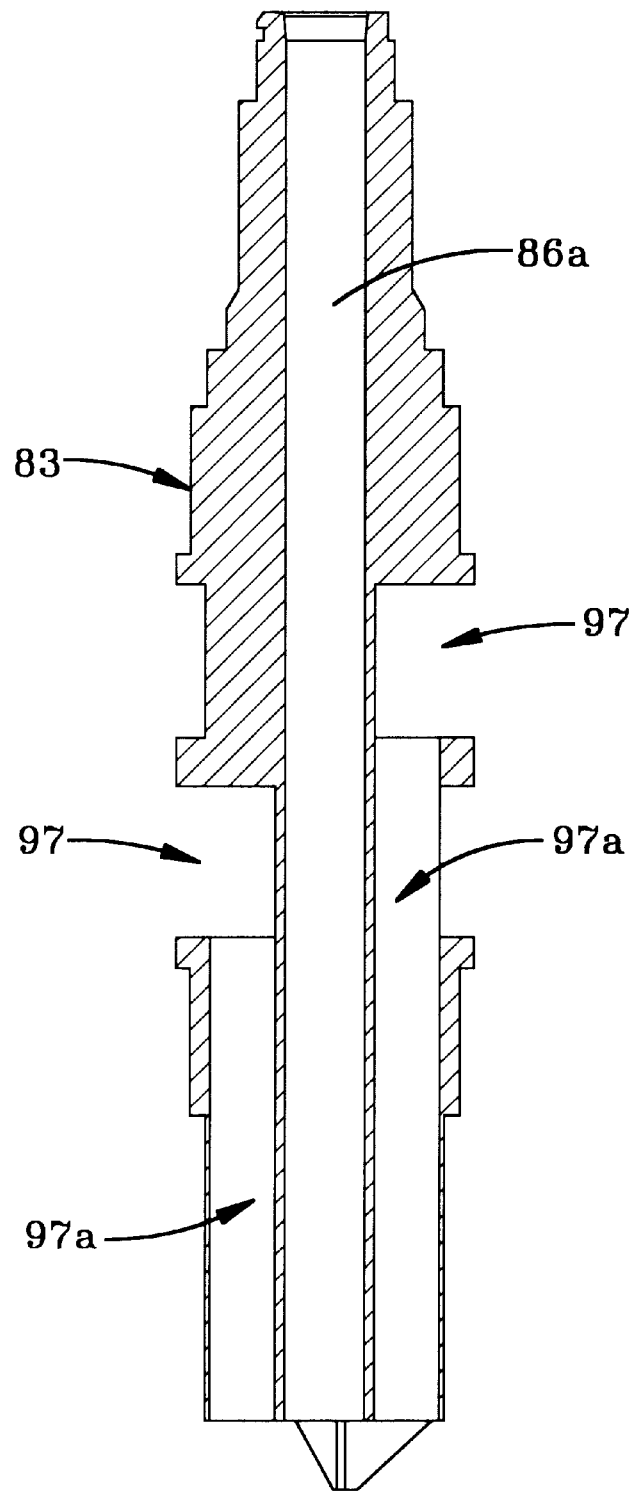
FIG. 9E is a longitudinal cross-section taken along line E—E of FIG. 9F.
Figure 9F:
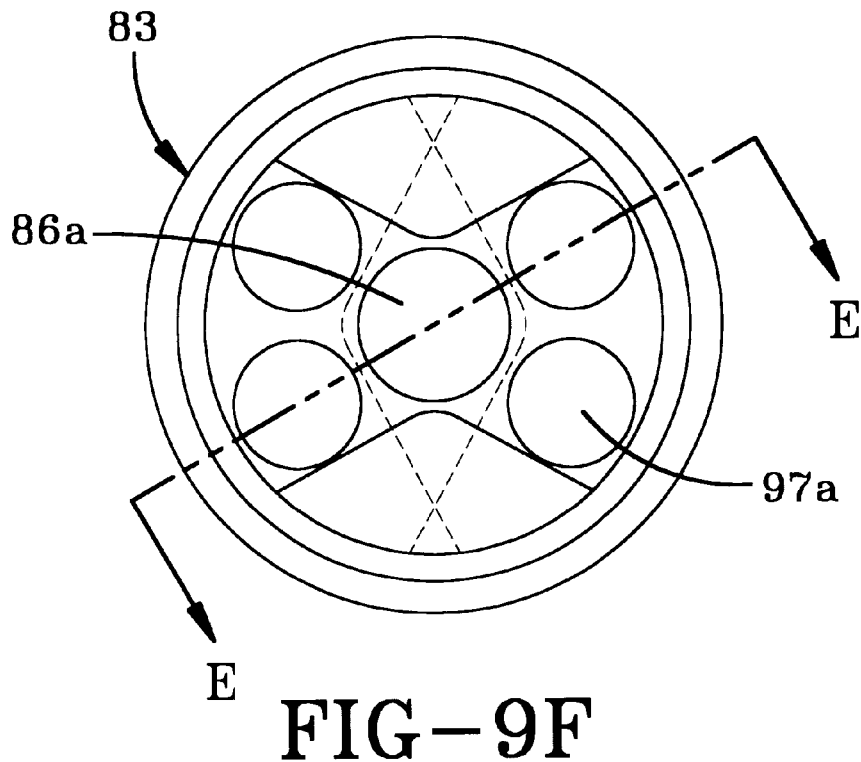
FIG. 9F is a bottom view of the inner valve body 3 shown in FIG. 9, in accordance with one embodiment of the present invention.

FIG. 9E is a longitudinal cross-section taken along line E—E of FIG. 9F. FIG. 9E shows inner valve body 83 and chambers 97 each of which is provided with a longitudinal conduit such as 97a. In this embodiment, chamber 97 extends about the circumference of the inner valve body, such that the fluid food product flow is continuously supplied to each of the chambers of the inner valve body 83 as it turns completely during each filling cycle. This is shown more clearly in the cross sections shown in FIGS. 9B and 9C. FIG. 9E also shows the center bore 86a into which plunger 6 extends (i.e. identical to that shown in other Figures). Plunger 6 reciprocates within center bore 86a to open and close the valve at the nozzle end during each filling cycle. It will be noted that a substantial portion of the area defined in the cross sections must remain accessible to the food product in order to allow for the longitudinal passage of the conduits 97a extending from other chambers, as is shown in FIGS. 9B and 9C.

FIG. 9F is a bottom view of inner valve body 83 shown in FIG. 9, in accordance with one embodiment of the present invention. FIG. 9F shows longitudinal conduits 97a and center bore 86a.

Figure 9G:
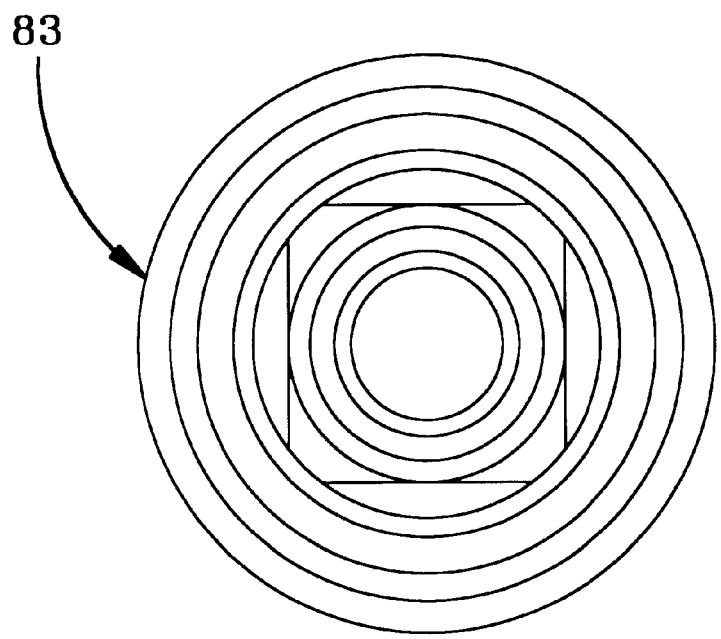
FIG. 9G is a top view of inner valve body 3 shown in FIG. 9, in accordance with one embodiment of the present invention.

FIG. 9G is a top view of inner valve body 83 shown in FIG. 9, in accordance with one embodiment of the present invention.

Figure 10:
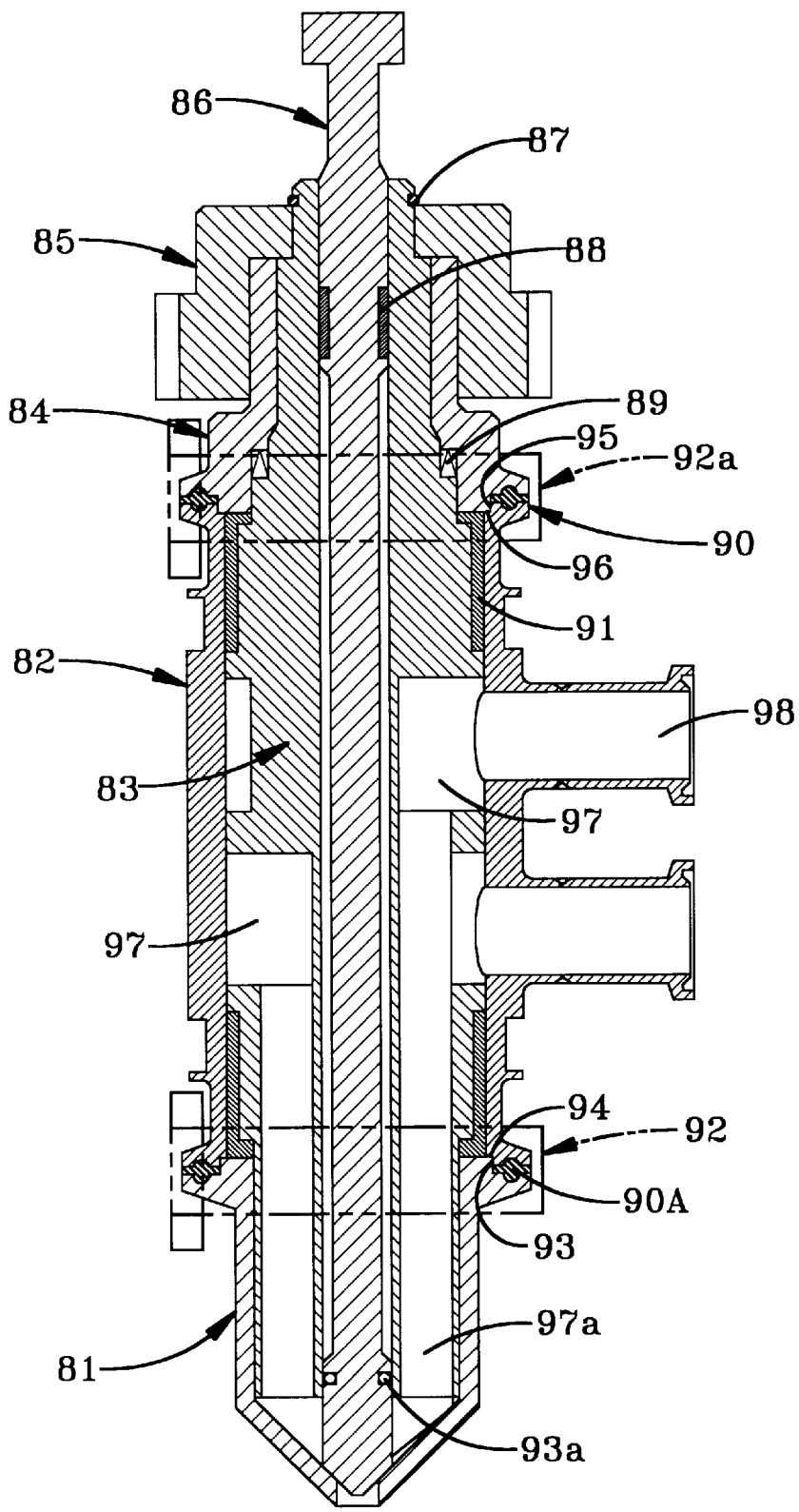
FIG. 10 is a cross-section elevation view of a spinning valve nozzle in accordance with one embodiment of the present invention.

FIG. 10 is a cross-section elevation view of a spinning valve nozzle in accordance with one embodiment of the present invention constructed from the components shown in FIGS. 8 through 9G. FIG. 10 shows the nozzle portion 81 of the outer valve body. Nozzle portion 81 is connected to a central portion 82 of the outer valve body by hand clamp 92 (shown in phantom; i.e., a two-inch "Ladish" clamp no. 13MHLA). This connection is mediated by gasket 90a (i.e., a two-inch "Ladish" 40MP-X). Nozzle portion 81 and center portion 82 are respectively provided with abutting shoulders 93 and 94 which cooperate to maintain these portions in an attached relationship so as to preserve the overall length of the outer valve body once assembled while maintaining gasket 10a and a compressed state. In similar fashion, top portion 84 of the outer valve body is attached to center portion 82, which attachment is fixed by cooperation of shoulders 95 and 96. The shoulders cooperate to maintain the top and central portions and a fixed-length relationship while maintaining gasket 90 in a day compressed state. This portion of the assembly is held together by hand clamp 92a shown in phantom.

The outer valve body contains inner valve body 83. Inner valve body 83 is held in place by the outer valve body so as to be able to spin within it. The inner valve body 83 is provided with bearings 91 and a seal 89 (i.e., such is a Parker Flexiseal FS#17498; proj. .1079).

The inner valve body 83 is provided with two or more annular or arcuate chambers 97 each aligned with respect to an inlet port 98. Each chamber 97 is provided with at least one fluid conduit (such as 97a) which extends parallel to the longitudinal axis of the inner valve body to the nozzle end of the outer valve body. These conduits discretely direct the fluid food product entering chamber 97 from inlet 98 to the nozzle to be dispensed into a container. The chambers 97 are arranged so that the individual fluid food product streams from each inlet port 18 are provided to the nozzle end of the valve without being mixed together.

Inner valve body 83 is provided with the central bore which extends plunger 86. Plunger 86 is provided with piston seal 93a (Parker #5036PDPY 003 N1069) and bearing 88. Plunger 86 serves to open and close the valve between registrations of the food product containers in series beneath it. As plunger 86 opens the valve during each filling cycle, the spinning inner valve body 83 supplies the opened nozzle with a flow of a multi-part flow (i.e., a three-part flow) of the fluid food product components. Examples may include multi-part flows of different ice cream flavors (such as three ice cream flavors) or multi-part flows of ice cream flavors and syrup (such as a flow of two ice cream flavors and one syrup). Plunger 86 may be actuated by any appropriate mechanical means, such as a cam gear driven by a motor and appropriately timed to be synchronized with the advance and registration of each container to be filled, in accordance with mechanical arrangements known and used in the art.

Figure 10A:
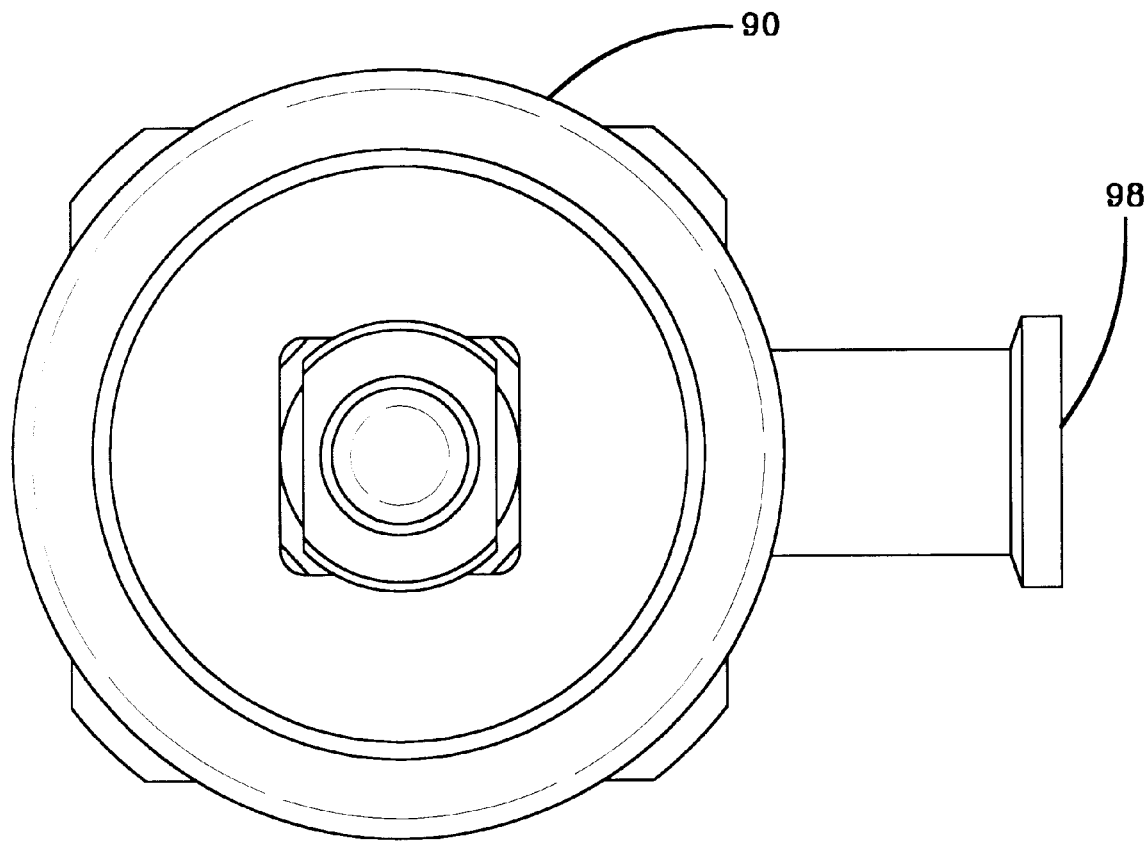
FIG. 10A is a top view of the value shown in FIG. 10, in accordance with one embodiment of the present invention.

The inner valve body is turned by action of valve gear 85 which engages the portion of the inner valve body extending from the outer valve body. Valve gear 85 spins about the top outer body portion 84, and has a central aperture having at least one flattened portion so as to be adapted to engage a correspondingly shaped portion of the inner valve body extending from the outer valve body. This can be more clearly seen in FIG. 10A which shows the top portion of inner valve body 83 having two flattened sides. Valve gear 85 is also held in position by O-ring 87 (Parker #3-116).

Depending upon the desired food product pattern to be achieved, the chambers 97 may be formed as arcuate chambers that do not extend completely about the circumference of the inner valve body portion 83. Taking into account the arrangement of the inlet ports 98 about the circumference of the outer valve body portion, arcuate chambers may be arranged so as to form a layered food product by dispensing discreet streams of the individual components of the multi-part product flow as the inner valve portion spins during a given fill cycle. For instance, three individual streams may be dispensed in discrete layers in series, or the three individual streams may be dispensed in discrete combinations, such as stream 1/stream 2 followed by stream 1/stream 3 followed by stream 2/stream 3.

To assemble the valve the same tool and procedure as described above may be used.

The valve shown in FIG. 3 is therefore designed to provide 2 discrete layers of a food product into the container.

In the preferred embodiment, the outer valve body is a three-piece construction as shown in the Figures.

It is also preferred that the outer valve body portions be held together by attachment means such as hand clamps, for ready assembly, cleaning and servicing, and re-assembly.

It is preferred that sections of the outer valve body be joined with Teflon O-ring seals.

In the preferred embodiment, the adjoining portions of the outer valve body are provided with shoulders at the gasket interfaces so as to provide accurate concentricity and constant overall length of the assembled outer valve body. This construction provides for a self-sizing champfer.

Where used to dispense an ice cream product, the spin rate preferably is approximately 120 rpm, but may be increased as high as 360 rpm or even 480 rpm. Typically, the containers, such as cups or "push-up" tubes, are filled at a rate of at least 120 per minute, or 60 registrations per minute in dual-valve machines. Normal containers for ice cream products will vary in volume in a range of about 2 to 5 fluid ounces.

For purposes of cleanliness, it is preferred that the spinning valve of the present invention be driven by a gear rather than a belt drive.

Figure 11:
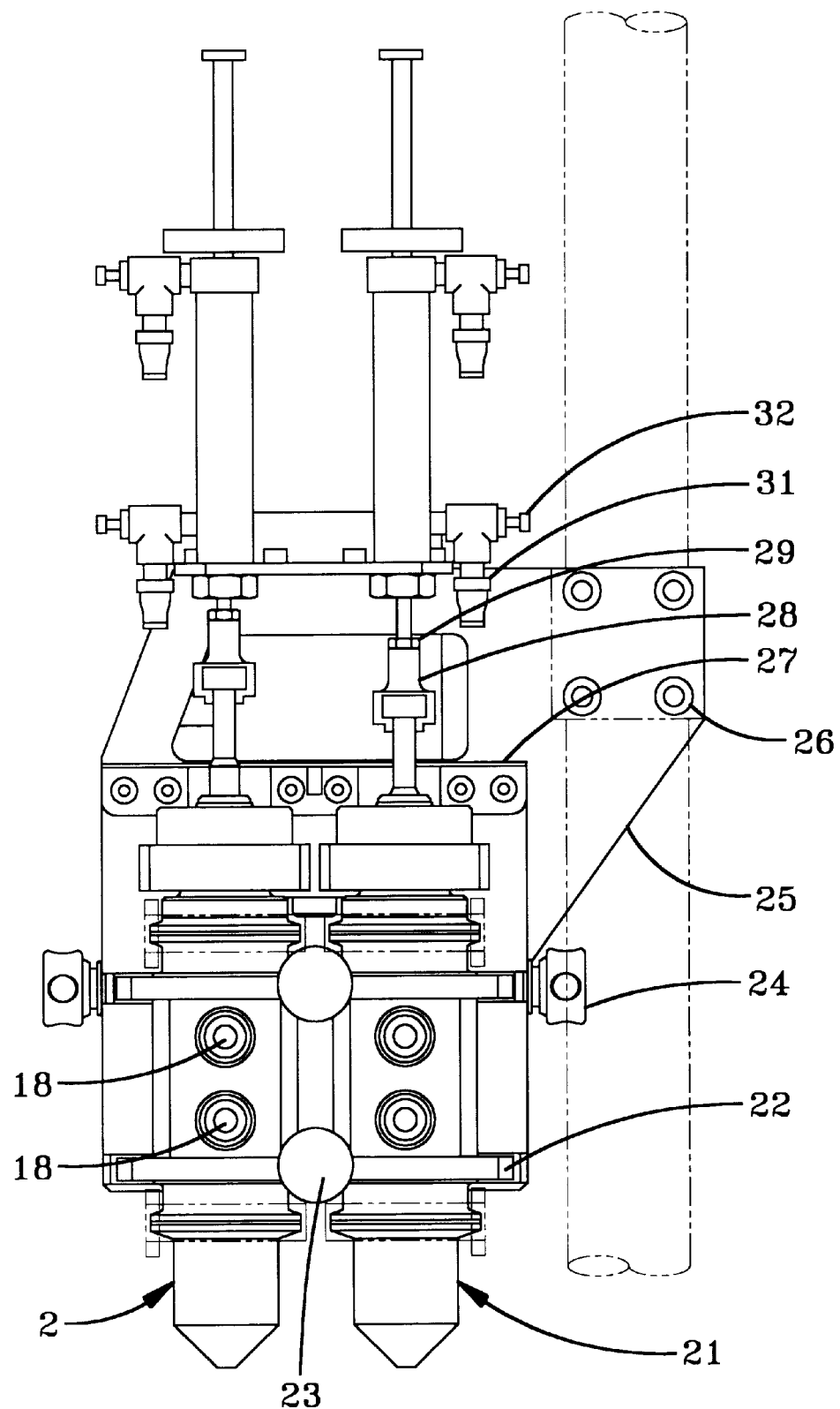
FIG. 11 is a front elevational view showing a tandem valve assembly incorporating two valves in a food product dispensing apparatus, in accordance with one embodiment of the present invention.

FIG. 11 is a front elevational view showing a tandem valve assembly incorporating two valves in a food product dispensing apparatus, in accordance with one embodiment of the present invention using the valve assembly shown in FIG. 3. The same tandem assembly may be used with valves shown in the other Figures.

FIG. 11 shows valve assembly 21 with inlets 18, held in place by a loose clamp bar 22. Loose clamp bar 22 is held in place by spanner nut 23 (i.e., ⁵⁄₁₆–24). Also shown is spanner nut 24 (i.e., ¼–28). FIG. 11 also shows mounting assembly 25 with the standoff 26 (attached to a vertical support shown in phantom). The assembly also includes a stationary guard 27, socket 28 and jam nut 29 (i.e., SS ¼–28). Also shown in FIG. 11 are the SMC flow control valves such as 31 with connectors such as 32 (which control the air volume through the inlets/outlets).

Figure 11A:
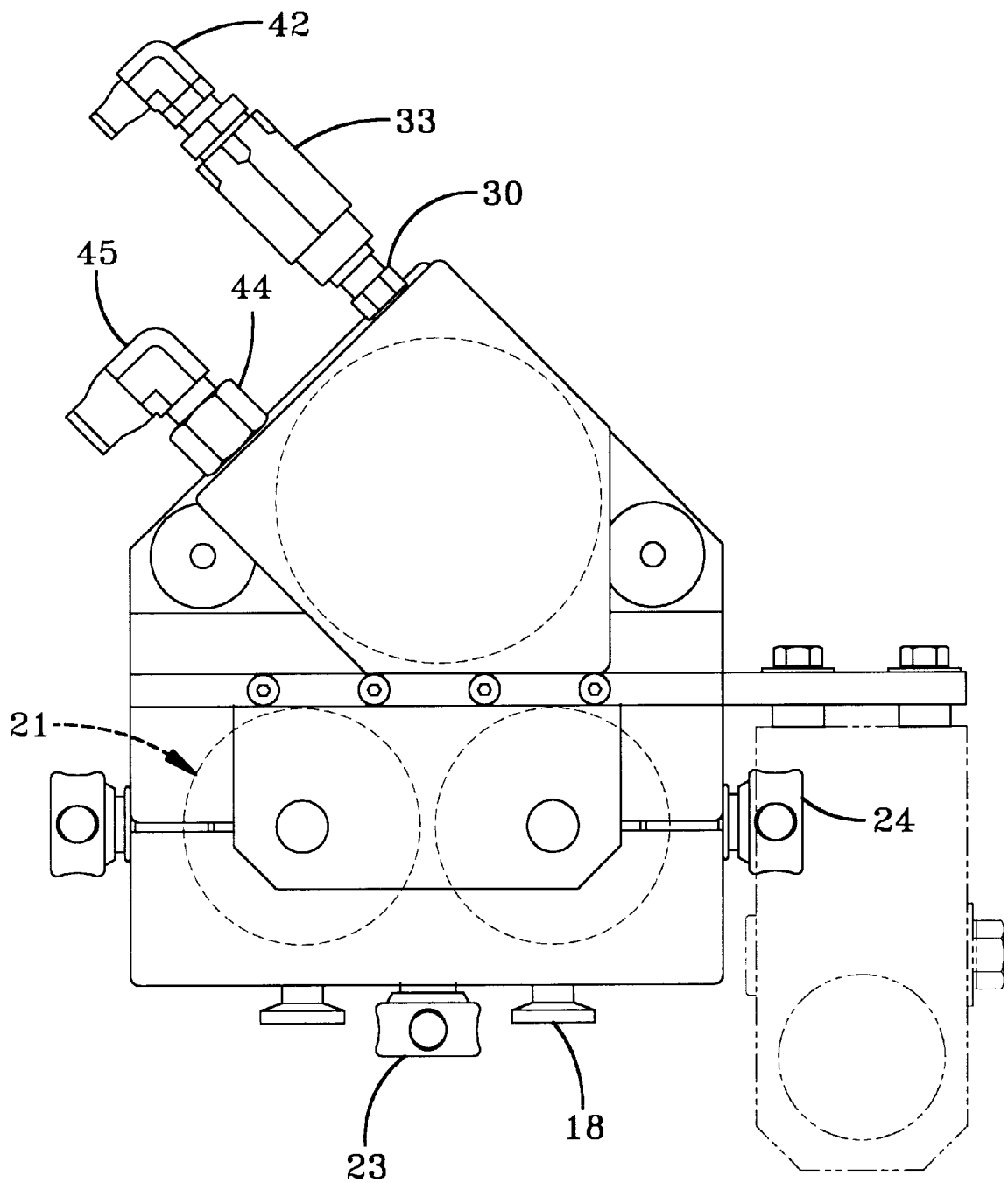
FIG. 11A is a top plan view of the valve assembly shown in FIG. 11, in accordance with one embodiment of the present invention.

FIG. 11A is a top plan view of the valve assembly shown in FIG. 11 with similar reference numbers. FIG. 11A shows hex nipple 30 which holds flow control valve 33 (Mead # MFI-25). Also shown is male connector 42 (Camozzi P6510-04-04), imp adapter 44 (⅜×¼; #120-B), elbow swivel 45 (Camozzi P6520-08-06).

Figure 11B:
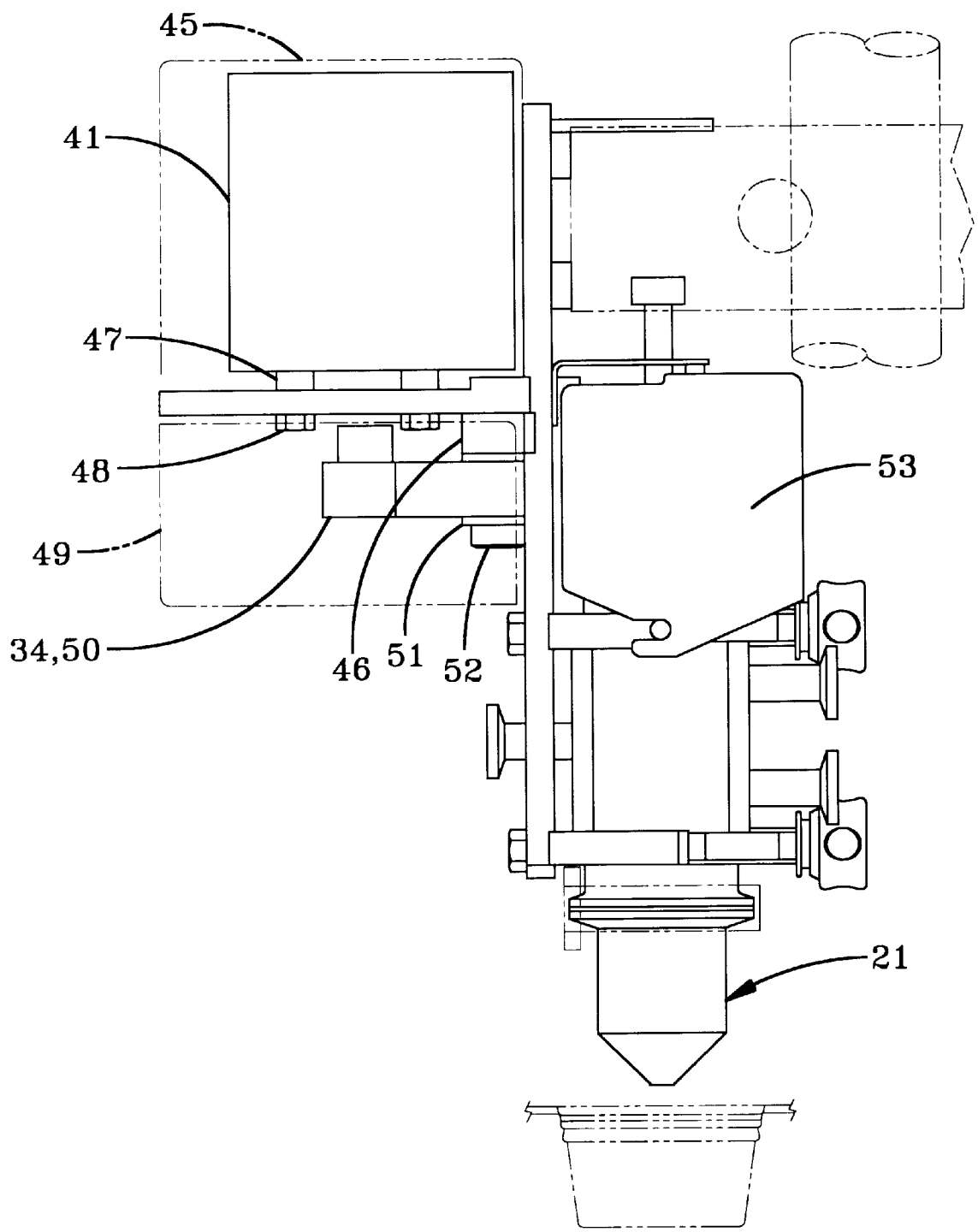
FIG. 11B is a lateral elevational view of the assembly shown in FIG. 11, showing the position of one of a pair of containers in the filling position, in accordance with one embodiment of the present invention.

FIG. 11B is a lateral elevational view of the assembly shown in FIG. 11 with similar reference numbers. FIG. 11B shows valve assembly 21 having inlets 18. Also shown in FIG. 11B are air motor cover 35, air motor 41, hex screw 48, main guard 49, set screw 34, keyed spur gear 50, idler mount spacer 46, and idler sprocket assembly 51. FIG. 11B also shows shoulder socket screw 52 and removable guard 53. FIG. 11B also shows another view of how the air motor 41 is connected to the valves through the gearing shown in phantom.

The valve operates by a combination of actions by a motor (shown in phantom beneath air motor cover 35 in FIG. 11) that spins the inner valve body while the center plunger is opened and closed during each fill cycle. In the described embodiment, reciprocating air pulses are sent alternatively into the opposing upper and lower air inlets, such as SMC flow control valves shown in FIG. 11, to open and close the valve during each dispensing cycle.

Figure 12:
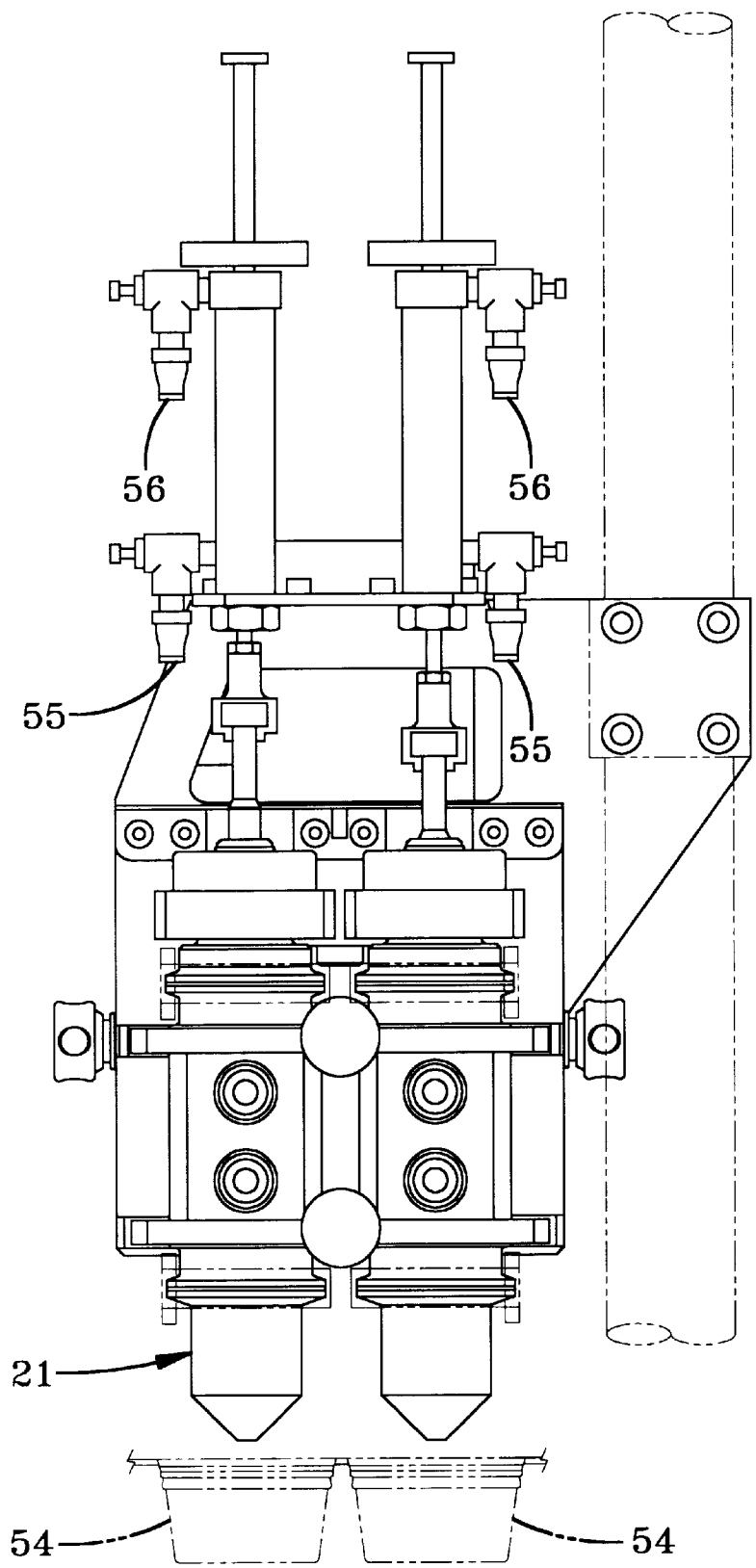
FIG. 12 is a front view of a tandem valve assembly incorporating two valves in a food product dispensing apparatus, showing the position of a pair of containers in the filling position, in accordance with one embodiment of the present invention.

FIG. 12 is a front view of a tandem valve assembly incorporating two valves in a food product dispensing apparatus, showing the position of a pair of containers in the filling position.

The tandem valve arrangement as shown in the FIGS. 11–12 may be used in an accordance with any appropriate container transportation/registration systems, such as those known and used in the art. Transportation/registration systems may include linear or circular/semi-circular path types. The tandem valve arrangement shown in the Figures may be used in accordance with a circular table-type transportation/registration system.

FIG. 12 shows containers 54 beneath valve assembly 21. The containers are registered in pairs beneath the valve nozzles by action of a transportation/registration apparatus. At this point, an air pulse is delivered to the lower air inlet 55 to open the valve while the inner valve body is spinning. The valve is maintained open for sufficient time to allow the container to be supplied with a layered or spun food product depending upon the embodiment of the valve of the present invention used. After an appropriate amount of time, the upper air inlet 55 is supplied with an air pulse to positively close the plunger valve in the center of the spinning inner valve body.

The foregoing description of the preferred embodiments of the present invention should be viewed of examples of the invention in its broadest terms as summarized above, and as reflected in the appended claims, which are hereby incorporated herein by reference.

In light of the foregoing disclosure, it will be within the ability of one skilled in the mechanical arts to make modifications to the present invention, such as through the substitution of equivalent materials and parts, and the arrangement of parts, or the application of equivalent process steps, without departing from the spirit of the invention.

What is claimed is:

1. A valve for dispensing at least two discrete streams of fluid, said valve comprising:
    an inner valve portion and an outer valve portion, said inner valve portion having a nozzle end and adapted to spin within said outer valve portion during dispensing of said at least two discrete streams of fluid;
    said outer valve portion having at least two inlets;
    said inner valve portion having a respective chamber in discrete fluid conductive alignment with each said inlet;
    and each said chamber having a fluid conduit adapted to discretely conduct a fluid to said nozzle end of said inner valve portion.

2. A valve according to claim 1 wherein said outer valve portion having at least three inlets.

3. A valve according to claim 1 wherein each said chamber is an annular chamber.

4. A valve according to claim 1 wherein each said chamber is an arcuate chamber.

5. A valve according to claim 4 wherein said each arcuate chamber defines an arc of a number of degrees, said number of degrees being approximately equal to 360/n wherein n is the number of said chambers.

6. A valve according to claim 4 wherein said each arcuate chamber defines an arc of a number of degrees, said number of degrees being approximately equal to 360/n wherein n is the number of said chambers, and wherein said arcuate chambers are staggered about said longitudinal axis and with respect to their respective inlet port such that at any given point in the travel of said inner valve portion, that n−1 discrete streams of fluid are supplied to said nozzle.

7. A valve according to claim 4 wherein said each arcuate chamber defines an arc of a number of degrees, said number of degrees being approximately equal to 360/n wherein n is the number of said chambers, and wherein said arcuate chambers are staggered about said longitudinal axis and with respect to their respective inlet port such that at any given point in the travel of said inner valve portion, that n−2 discrete streams of fluid are supplied to said nozzle.

8. A valve according to claim 1 wherein said outer valve portion comprises two pieces.

9. A valve according to claim 1 wherein said outer valve portion comprises three pieces.

10. A valve according to claim 1 wherein said outer valve portion comprises two pieces defining an interface therebetween, said pieces having a compressible gasket in said interface, said two pieces comprising an interface abutment portion so as to restrict the compression of said gasket in said interface.

11. A valve according to claim 1 wherein said valve additionally comprising a gear in removable engagement with said inner valve portion.

12. A valve according to claim 1 wherein said inner valve portion has a cylindrical portion, said cylindrical portion having at least two annular chambers substantially perpendicular to said longitudinal axis, each said respective chamber connected to a longitudinal fluid conduit adapted to conduct a fluid to said nozzle; and said outer valve body adapted to enclose said inner valve portion, allowing said cylindrical portion to spin therewithin.

13. An apparatus for dispensing at least two discrete streams of fluid into a series of containers, said apparatus comprising:
    (a) a container transport apparatus adapted to transport said containers in a series to and beyond a filling position;
    (b) a filling apparatus positioned so as to fill one of said containers, when one of said containers is in said filling position, said filling apparatus comprising:
        (1) a valve for dispensing at least two discrete streams of liquid, said valve comprising:
    an inner valve portion and an outer valve portion, said inner valve portion having a nozzle end and adapted to spin within said outer valve portion,
    said outer valve portion having at least two inlets,
    said inner valve portion having a respective chamber in discrete fluid conductive alignment with each said inlet,
    and each said chamber in fluid conductive alignment with a fluid conduit adapted to discretely conduct a fluid to said nozzle end of said inner valve portion; and
        (2) a motor connected to said inner valve portion and adapted to spin said inner valve portion within said outer valve body.

14. A valve for dispensing at least two discrete streams of fluid, said valve comprising:
    an inner valve portion and an outer valve portion, said inner valve portion having a nozzle end and adapted to spin within said outer valve portion, said outer valve portion having a longitudinal axis;
    said outer valve portion having n inlets, said inlets being directed at substantially the same location along said longitudinal axis of said outer valve portion;
    said inner valve portion having x chambers being at substantially the same location along said longitudinal axis of said outer valve portion as said inlets, and said chambers of sufficient size so as to be in fluid conductive alignment with less than all of said inlets at any point along the rotation of said inner valve portion within said outer valve portion, wherein n is an integer greater than one and n−x is a positive integer of one or more; and
    each said chamber having a fluid conduit adapted to conduct a fluid to said nozzle end of said inner valve portion.

15. A valve according to claim 14 wherein said each chamber defines an arc of a number of degrees, said number of degrees being approximately equal to 360/x.

16. A valve according to claim 14 wherein said each chamber defines an arc of a number of degrees, said number of degrees being approximately equal to 360/x, and wherein said arcuate chambers are disposed about said longitudinal axis and with respect to said inlet ports such that at any given point in the travel of said inner valve portion, that n−1 discrete streams of fluid are supplied to said nozzle.

17. A valve according to claim 16 comprising two inlets each directed toward said longitudinal axis at an angle of about 180 degrees and comprising one chamber defining an arc of about 180 degrees.

18. A valve according to claim 16 comprising three inlets each directed toward said longitudinal axis at an angle of about 120 degrees and comprising two adjacent chambers each defining an arc of about 120 degrees.

19. A valve according to claim 14 wherein said each arcuate chamber defines an arc of a number of degrees, said number of degrees being approximately equal to 360/x, and wherein said chambers are disposed about said longitudinal axis and with respect to said inlet ports such that at any given point in the travel of said inner valve portion, that n−2 discrete streams of fluid are supplied to said nozzle.

20. A valve according to claim 19 comprising three inlets each directed toward said longitudinal axis at an angle of about 120 degrees and comprising one chamber each defining an arc of about 120 degrees.

21. A valve according to claim 19 comprising four inlets each directed toward said longitudinal axis at an angle of about 90 degrees and comprising two chambers each defining an arc of about 90 degrees.

22. A valve according to claim 14 wherein said each chamber defines an arc of a number of degrees, said number of degrees being approximately equal to 360/x, and wherein said arcuate chambers are disposed about said longitudinal axis and with respect to said inlet ports such that at any given point in the travel of said inner valve portion, that n−3 discrete streams of fluid are supplied to said nozzle.

23. A valve according to claim 22 comprising four inlets each directed toward said longitudinal axis at an angle of about 90 degrees and comprising one arcuate chamber each defining an arc of about 90 degrees.

24. A valve according to claim 22 wherein said outer valve portion comprises two pieces.

25. A valve according to claim 14 wherein said outer valve portion comprises three pieces.

26. A valve according to claim 14 wherein said outer valve portion comprises two pieces defining an interface therebetween, said pieces having a compressible gasket in said interface, said two pieces comprising an interface abutment portion so as to restrict the compression of said gasket in said interface.

27. A valve according to claim 14 wherein said valve additionally comprises a gear in removable engagement with said inner valve portion.

28. An apparatus for dispensing at least two discrete streams of fluid into a series of containers, said apparatus comprising:
(a) a container transport apparatus adapted to transport said containers in a series to and beyond a filling position;
(b) a filling apparatus positioned so as to fill one of said containers, when one of said containers is in said filling position, said filling apparatus comprising:
(1) a valve for dispensing at least two discrete streams of liquid, said valve comprising:
an inner valve portion and an outer valve portion, said inner valve portion having a nozzle end and adapted to spin within said outer valve portion, said outer valve portion having a longitudinal axis;
said outer valve portion having n inlets, said inlets being directed at substantially the same location along said longitudinal axis of said outer valve portion;
said inner valve portion having x chambers being at substantially the same location along said longitudinal axis of said outer valve portion as said inlets, and said chambers of sufficient size so as to be in fluid conductive alignment with less than all of said inlets at any point along the rotation of said inner valve portion within said outer valve portion, wherein n is an integer greater than one and n−x is a positive integer of one or more; and
each said chamber having a fluid conduit adapted to conduct a fluid to said nozzle end of said inner valve portion; and
(2) a motor connected to said inner valve portion and adapted to spin said inner valve portion within said outer valve body.

29. A valve for dispensing at least two discrete streams of fluid, said valve comprising:
an inner valve portion and an outer valve portion, said inner valve portion having a nozzle end and adapted to spin within said outer valve portion;
said outer valve portion having at least two inlets;
said inner valve portion having a respective chamber in discrete fluid conductive alignment with each said inlet; and
each said chamber being an arcuate chamber and having a fluid conduit adapted to discretely conduct a fluid to said nozzle end of said inner valve portion.

30. A valve according to claim 29 wherein said each arcuate chamber defines an arc of a number of degrees, said number of degrees being approximately equal to 360/n wherein n is the number of said chambers.

31. A valve according to claim 29 wherein said each arcuate chamber defines an arc of a number of degrees, said number of degrees being approximately equal to 360/n wherein n is the number of said chambers, and wherein said arcuate chambers are staggered about said longitudinal axis and with respect to their respective inlet port such that at any given point in the travel of said inner valve portion, that n−1 discrete streams of fluid are supplied to said nozzle.

32. A valve for dispensing at least two discrete streams of fluid, said valve comprising:
an inner valve portion and an outer valve portion, said inner valve portion having a nozzle end and adapted to spin within said outer valve portion;
said outer valve portion comprising two pieces defining an interface therebetween, said pieces having a compressible gasket in said interface, said two pieces comprising an interface abutment portion so as to restrict the compression of said gasket in said interface;
said outer valve portion having at least two inlets;
said inner valve portion having a respective chamber in discrete fluid conductive alignment with each said inlet; and
each said chamber having a fluid conduit adapted to discretely conduct a fluid to said nozzle end of said inner valve portion.

33. A valve for dispensing at least two discrete streams of fluid, said valve comprising:

an inner valve portion and an outer valve portion, said inner valve portion having a nozzle end and adapted to spin within said outer valve portion, said outer valve portion having a longitudinal axis;

said outer valve portion having n inlets, said inlets being directed at substantially the same location along said longitudinal axis of said outer valve portion;

said inner valve portion having x chambers being at substantially the same location along said longitudinal axis of said outer valve portion as said inlets, and said chambers of sufficient size so as to be in fluid conductive alignment with less than all of said inlets at any point along the rotation of said inner valve portion within said outer valve portion, wherein n is an integer greater than one and n−x is an positive integer of one or more;

each said chamber having a fluid conduit adapted to conduct a fluid to said nozzle end of said inner valve portion; and each said chamber defining an arc of a number of degrees, said number of degrees being approximately equal to 360/x.

34. A valve for dispensing at least two discrete streams of fluid, said valve comprising:

an inner valve portion and an outer valve portion, said inner valve portion having a nozzle end and adapted to spin within said outer valve portion, said outer valve portion having a longitudinal axis;

said outer valve portion having n inlets, said inlets being directed at substantially the same location along said longitudinal axis of said outer valve portion;

said inner valve portion having x chambers being at substantially the same location along said longitudinal axis of said outer valve portion as said inlets, and said chambers of sufficient size so as to be in fluid conductive alignment with less than all of said inlets at any point along the rotation of said inner valve portion within said outer valve portion, wherein n is an integer greater than one and n−x is an positive integer of one or more;

each said chamber having a fluid conduit adapted to conduct a fluid to said nozzle end of said inner valve portion; and each said chamber defines an arc of a number of degrees, said number of degrees being approximately equal to 360/x, and wherein said arcuate chambers are disposed about said longitudinal axis and with respect to said inlet ports such that at any given point in the travel of said inner valve portion, that n−1 discrete streams of fluid are supplied to said nozzle.

35. A valve according to claim 34 comprising two inlets each directed toward said longitudinal axis at an angle of about 180 degrees and comprising one chamber defining an arc of about 180 degrees.

36. A valve according to claim 34 comprising three inlets each directed toward said longitudinal axis at an angle of about 120 degrees and comprising two adjacent chambers each defining an arc of about 120 degrees.

37. A valve for dispensing at least two discrete streams of fluid, said valve comprising:

an inner valve portion and an outer valve portion, said inner valve portion having a nozzle end and adapted to spin within said outer valve portion, said outer valve portion having a longitudinal axis;

said outer valve portion comprising two pieces defining an interface therebetween, said pieces having a compressible gasket in said interface, said two pieces comprising an interface abutment portion so as to restrict the compression of said gasket in said interface;

said outer valve portion having n inlets, said inlets being directed at substantially the same location along said longitudinal axis of said outer valve portion;

said inner valve portion having x chambers being at substantially the same location along said longitudinal axis of said outer valve portion as said inlets, and said chambers of sufficient size so as to be in fluid conductive alignment with less than all of said inlets at any point along the rotation of said inner valve portion within said outer valve portion, wherein n is an integer greater than one and n−x is an positive integer of one or more; and each said chamber having a fluid conduit adapted to conduct a fluid to said nozzle end of said inner valve portion.

* * * * *

-UNITED STATES PATENT AND TRADEMARK OFFICE
CERTIFICATE OF CORRECTION

PATENT NO.    : 6,223,949 B1
DATED         : May 1, 2001
INVENTOR(S)   : Jack Spencer et al.

Page 1 of 1

It is certified that error appears in the above-identified patent and that said Letters Patent is hereby corrected as shown below:

Column 1,
Line 43, please delete the word "arid" and replace it with -- and --.

Column 9,
Line 11, please delete the number "3" and replace it with -- 6 --.

Signed and Sealed this

Eleventh Day of September, 2001

Attest:

*Nicholas P. Godici*

NICHOLAS P. GODICI
*Attesting Officer*     *Acting Director of the United States Patent and Trademark Office*